United States Patent [19]
Mendelson et al.

[11] Patent Number: 5,568,614
[45] Date of Patent: Oct. 22, 1996

[54] DATA STREAMING BETWEEN PEER SUBSYSTEMS OF A COMPUTER SYSTEM

[75] Inventors: Richard N. Mendelson, Highland Beach; Ralph M. Pipitone, Boynton Beach, both of Fla.

[73] Assignee: International Business Machines Corporation, Armonk, N.Y.

[21] Appl. No.: 282,993

[22] Filed: Jul. 29, 1994

[51] Int. Cl.$^6$ .................................................. G06F 15/16
[52] U.S. Cl. ..................... 395/200.08; 395/474; 395/842; 364/DIG. 1; 364/242.3; 364/240.8
[58] Field of Search ..................................... 395/800, 890, 395/200.05, 842, 290, 474, 200.8, 479

[56] References Cited

U.S. PATENT DOCUMENTS

| | | | |
|---|---|---|---|
| 5,185,877 | 2/1993 | Bissett et al. | 395/425 |
| 5,195,185 | 3/1993 | Marenin | 395/325 |
| 5,263,139 | 11/1993 | Testa et al. | 395/325 |
| 5,513,368 | 4/1996 | Garcia, Jr. et al. | 395/842 |

*Primary Examiner*—Mehmet B. Geckil
*Attorney, Agent, or Firm*—Daniel E. McConnell

[57] ABSTRACT

A data handling arrangement for a computer system, with particular application to multimedia systems, allows device adapters (control units) attached to the system to autonomously (without interrupting the system processor) control processing of a data stream of arbitrary length through memory buffers which are smaller than the stream. In this (stream processing) operation, data constituting the data stream flows through devices controlled by the adapter in succession, and is held in shared memory buffers as it passes between devices. The adapters are prepared for the stream processing operation by a system processor, indicate their preparation status to the processor, receive an initiating signal from the processor, and then proceed to direct the operation to completion without further assistance from the processor. In the operation, the adapters coordinate usage of the memory buffers by respective devices. Coordination is accomplished using a notification signalling protocol defined during preparation of the adapters.

21 Claims, 14 Drawing Sheets

Figure 1      Prior Art
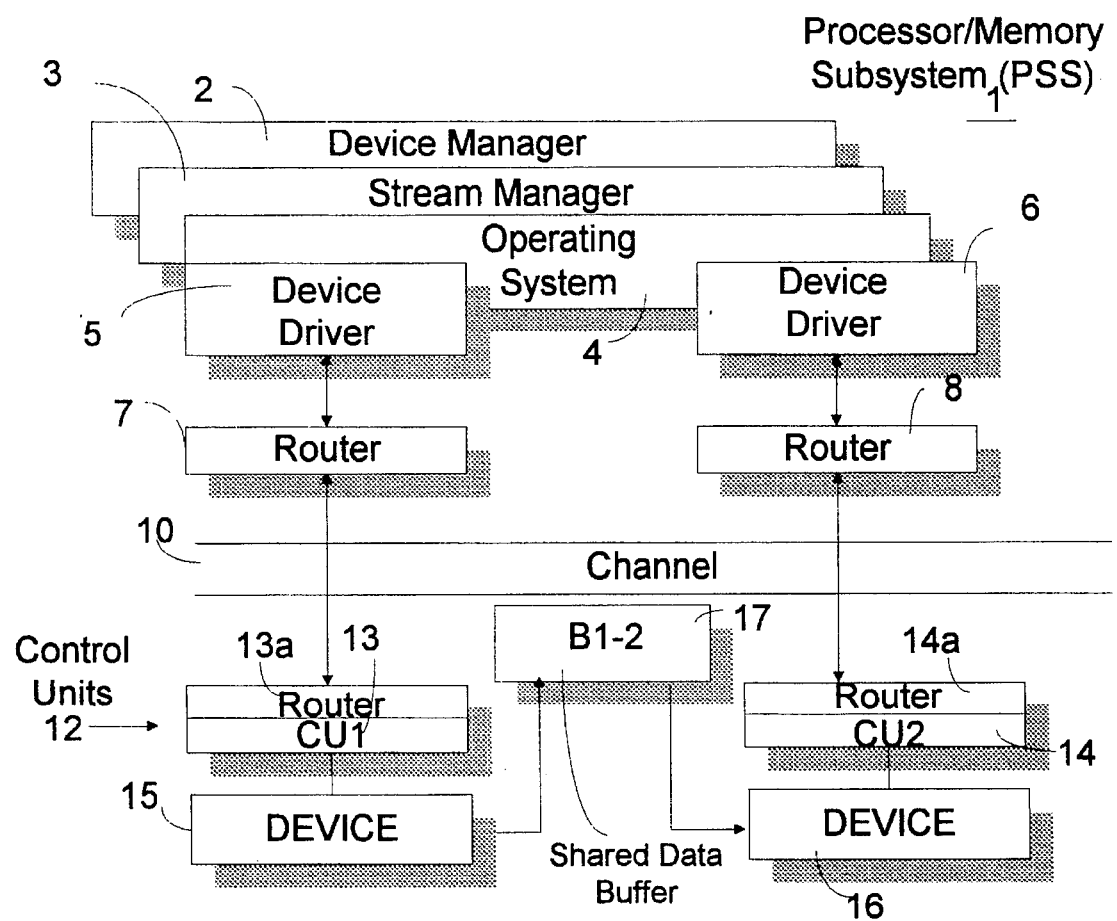
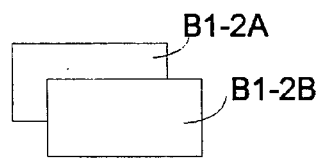
Figure 1B

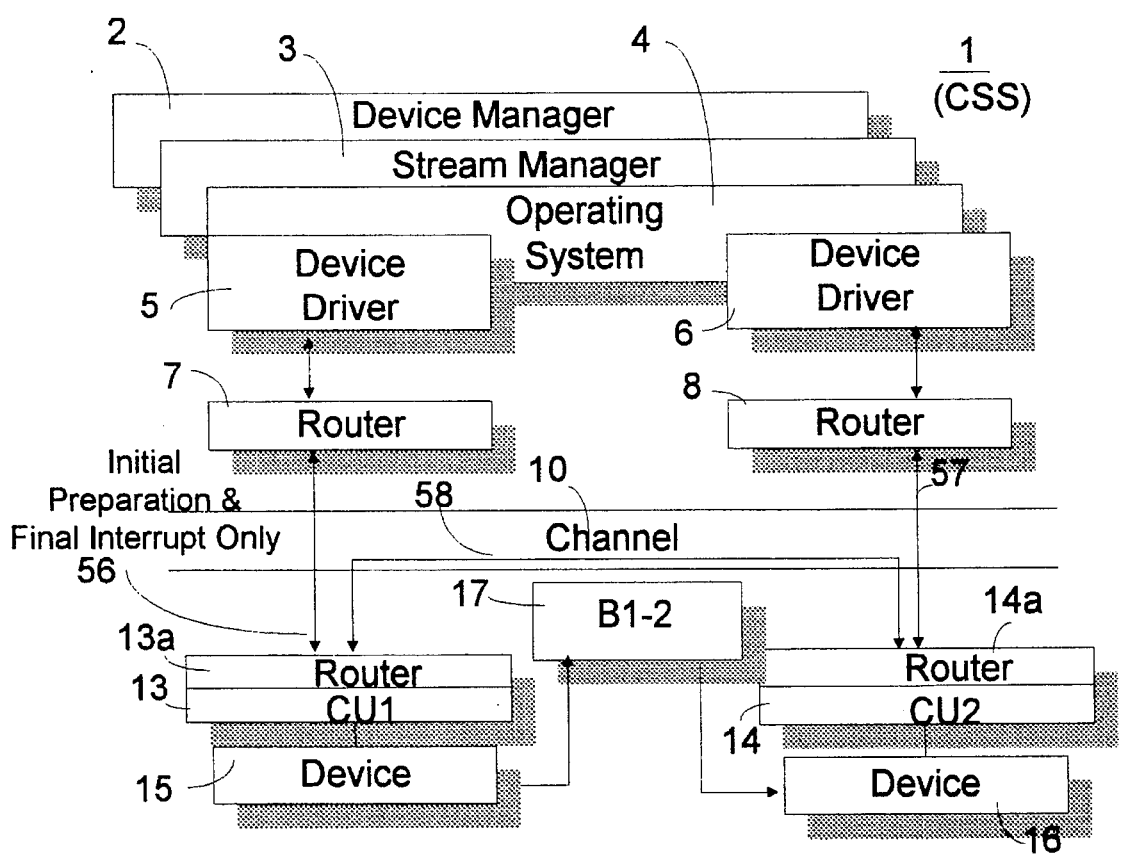

Figure 9
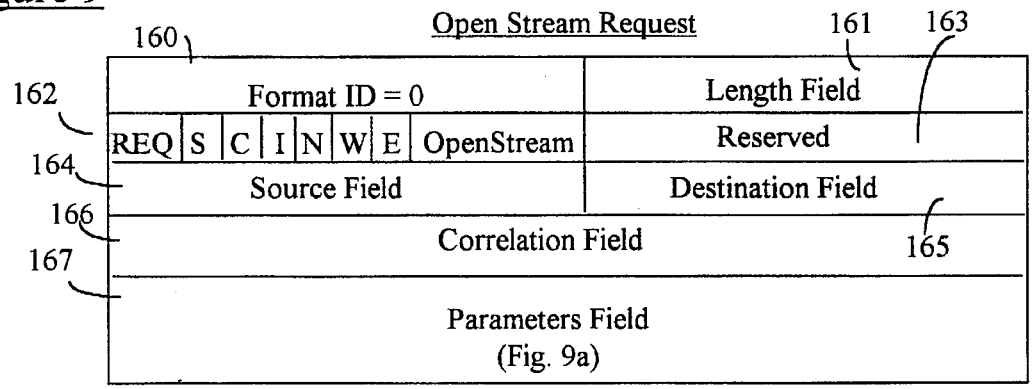
Figure 9a
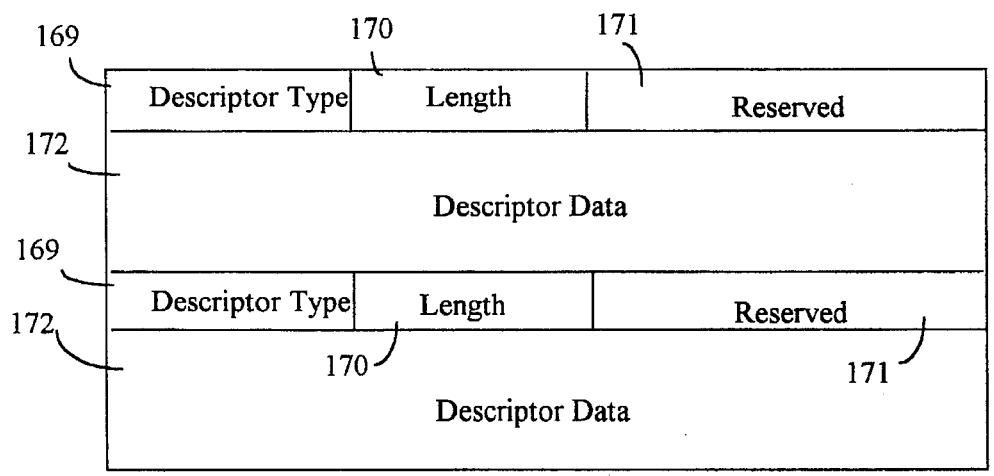
Figure 10
| Buffer Group Descriptor ||||
| --- | --- | --- | --- |
| 010C | Reserved |||
| Buffer Group ID | Reserved |||
| No. of Buffers | Flags | Rel. Priority | Reserved |

Figure 11

Buffer Descriptor

| 0214 | | Reserved | |
|---|---|---|---|
| Buffer Group ID | | Buffer ID | |
| Buffer Address | | | |
| Buffer Length (bytes) | | | |
| Flags | Reserved | Reserved | Reserved |

Figure 12

Buffer Notification Descriptor

| 030C | | Reserved |
|---|---|---|
| Buffer Group ID | | Buffer ID |
| Flags | Flags | Signal Code/Address//Unit/Ent |

Figure 13

Input Signal Code Descriptor

| 040C | | Reserved | |
|---|---|---|---|
| Buffer Group ID | | Buffer ID | |
| Flags | Reserved | Signal Code | I/O Port @ |

Figure 14

Synchronization Descriptor

| 0510 | | Reserved | |
|---|---|---|---|
| Buffer Group ID | | Reserved | |
| Flags | Reserved | Reserved | Reserved |
| Stream ID / Timer Address | | | |

Figure 15

Transform Descriptor

| 06 | xx | Reserved |
|---|---|---|
| Stream Correlation ID ||| 
| Device Dependent Control Element |||

Figure 16

Buffer Control Request Element

| Format ID = 0 ||||||| Length Field ||
|---|---|---|---|---|---|---|---|---|
| REQ | S | C | I | N | W | E | BufferControl | Reserved |
| Source Field |||||||| Destination Field |
| Correlation Field |||||||||
| Parameters Field<br>(Fig. 16a) |||||||||

Figure 16a

| Buffer Group ID || Buffer ID ||
|---|---|---|---|
| Flags | Reserved | Reserved | Reserved |
| Error Code ||||
| Residual Byte Count ||||
| Device Dependent ||||

Figure 17  Buffer Synch Control Request Element

| Format ID = 0 | | | | | | | Length Field |
|---|---|---|---|---|---|---|---|
| REQ | S | C | I | N | W | E | SyncControl | Reserved |
| Source Field | | | | | | | Destination Field |
| Correlation Field ||||||||
| Parameters Field (Fig. 17a) ||||||||

Figure 17a

| Buffer Group ID | | | Reserved |
|---|---|---|---|
| Flags | Reserved | Reserved | Reserved |
| Timer Address / Stream Correlation ID ||||
| Device Dependent ||||

Figure 18  Stream Control Request Element

| Format ID = 0 | | | | | | | Length Field |
|---|---|---|---|---|---|---|---|
| REQ | S | C | I | N | W | E | StreamControl | Reserved |
| Source Field | | | | | | | Destination Field |
| Correlation Field ||||||||
| Parameters Field (Fig. 18a) ||||||||

Figure 18a

| Stream Correlation ID | | | |
|---|---|---|---|
| Stream Cmd | Sync Flags | Reserved | Reserved |
| Timer Address ||||
| Timer Value ||||
| Transform Descriptor (Optional) ||||

(from 19a)

DATA STREAMING BETWEEN PEER SUBSYSTEMS OF A COMPUTER SYSTEM

CROSS-REFERENCES TO RELATED APPLICATIONS

U.S. patent application Ser. No. 08/076,081 filed Jun. 11, 1993 by F. Bonavento et al issued as U.S. Pat. No. 5,325,492 on Jun. 28, 1994, a continuation of application Ser. No. 07/411,145 filed Sep. 22, 1989 and now abandoned, titled APPARATUS AND METHOD FOR ASYNCHRONOUSLY DELIVERING CONTROL ELEMENTS WITH A PIPE INTERFACE, describes a command delivery mechanism which may be used as a component of the presently disclosed invention.

BACKGROUND OF THE INVENTION

1. Technical Field

The invention relates to the handling of data transfers between components of a computer system, and has particular application for improvement of contemporary multimedia functions.

2. Problem Solved

In contemporary computer systems, transfers of data between processor or memory subsystems and peripheral devices, generally have been tightly controlled by the processor subsystem. Typically, each peripheral device receives a command block from the processor subsystem initiating a single data transfer operation between the device and a predefined part of the memory subsystem, performs the operation, interrupts the processor subsystem to report the concluding status of the operation, and then waits for another command from the processor subsystem.

A problem in this respect is that operations requiring movement of large volumes of data (hereafter "data streams" encompassing multiple block lengths) between buffer spaces in the memory subsystem and multiple peripheral devices, interruption handling operations of the processor tend to degrade efficiency (reduce the rate of data throughput). This effect is especially pronounced in multimedia systems wherein for example audio and video components of a "long" motion picture (e.g. one taking over an hour to present) are stored electronically on a mass medium (e.g. CD-ROM)in a compressed and possibly encrypted form, and processed by peripheral devices (for decompression and/or decryption) before being applied to speaker and display monitor components of the system.

In order to use buffer space in the memory subsystem efficiently, the processor would segment the process relative to each device into many commands individually defining the handling of small blocks of data (blocks whose lengths are orders of magnitude shorter than the length of the aggregate data stream that is to be processed), and monitor status of each block operation (via interrupt handling) before advancing the process. Assuming that the memory buffer spaces allocated for individual block transfers are of reasonable size, the latency/delay introduced by such status monitoring actions is difficult to accommodate.

The difficulty is compounded when the block handling processes have synchronism restrictions; e.g. restrictions requiring sound and picture data of blocks to be applied synchronously at respective speaker and display destinations. It is further compounded by the number of devices sequentially handling the data. Thus, for example, data that is processed successively by four devices (e.g. loaded into memory buffers by a first device, decompressed by a second device, decrypted by a third device, and routed to a destination by a fourth device) would encounter much more delays in processor interrupt handling than data that is handled successively by only one or two devices.

The present invention seeks to provide a more efficient mechanism for handling such data stream functions; i.e. a mechanism which has less latencies associated with processor interrupt handling than contemporary systems and therefore can use smaller memory buffers between units.

SUMMARY OF THE INVENTION

This objective is achieved by providing a bus system between the processor and the peripheral devices which allows for devices to act as bus masters, and directly communicate with other devices, without channeling their communications through a central processor, and adapting devices that attach to such bus system to autonomously perform data stream handling operations without interrupting the central processor system which initiates respective operations.

Although bus systems allowing for alternate bus mastership by central processors and peripheral devices are well known—an example being the Micro Channel[1] bus system—adaptation of devices to autonomously conduct data streaming operations via such bus systems is considered novel.

[1]Micro Channel is a trademark of the International Business Machines Corporation The objective is furthered by adapting central processor systems to concurrently prepare plural such devices (i.e. devices that are adapted for "data streaming"), or respective device control units, in advance of the actual handling of a data stream, and to verify that all of the devices involved are properly prepared before initiating a data streaming operation between the devices. The preparation leaves all of the devices, or respective device control units, with all of the control information needed to perform respective data streaming functions. The control information prepares the control units and associated devices to cooperatively process the entire stream without further assistance from the processor (i.e. without timing dependencies associated with interruptions of and interventions by the processor and associated layers of software in the processor which are concerned with management of stream processing functions). The control units and associated devices may be attached to the processor as peripherals or they may be virtual components simulated in the processor subsystem.

After such preparation, a go-ahead signal is given to a device control unit which is the first one scheduled to handle the stream of data (retrieving it from a source device designated by the control information, and performing a transforming process on it if instructed to do so).

The objective is further attained by providing the units with logical capabilities to accomplish their respective data stream processing functions through logical interpretation of the control information furnished by the processor, and predetermined reactions to signals received from other units during stream processing (which signals are defined in advance by the control information).

After the go-ahead signal is given the control units proceed to perform a "data stream" processing ("data streaming") operation defined by the control information. The data so processed, which may consist of many blocks of data, is passed through "block sized" memory buffers shared by communicating pairs of control units. Each buffer may be filled and emptied many times during the execution of a single streaming process. The buffers are preallocated by the processor, but it is up to the device control units to properly manage their use.

Essential functions defined by the control information which prepares these device control units for a data streaming process include: 1) the source of the respective device control unit's input data; 2) if the source is one or more input (memory) buffers shared with a prior unit (i.e. assigned as output buffers to the prior unit), the policy for managing such input buffers (e.g. the size and number of these buffers, and their locations in the memory address space of the system if appropriate); 3) the destination of data resulting from the respective unit's handling of the stream; 4) if the destination is an output buffer shared with a subsequent unit, the policy for managing that buffer; 4) signals or events that will notify the respective unit that an input buffer is available for processing; 5) signals or indications to be generated by the respective unit for notifying a prior unit that the respective unit has finished processing an input buffer shared with the prior unit (i.e. that such buffer is effectively available for reuse); 6) signals or indications to be generated for notifying a next unit that an output buffer is available for processing; 7) the operation to be performed by the respective unit on its source/input data; 8) functions to be performed by the respective unit for synchronizing its handling of the stream data with handling of data in other streams (e.g. for synchronizing the handling of picture/video data in one stream with corresponding audio data in another stream); and 9) procedures to be used by the respective unit for detecting and recovering from error.

Each unit is architected logically to be able to interpret the control information furnished to it by the processor, perform defined stream processing functions, react to defined signals from other units and generate defined signals to other units. Those skilled in the art will understand that logical functions for such architecture can be easily implemented in otherwise conventional units; and they will understand also the performance tradeoffs associated with implementing such functions via dedicated special purpose logic (e.g. state machines) and general purpose logic designed for interpreting microprogram type firmware.

BRIEF DESCRIPTION OF THE DRAWINGS

FIG. 1 is a schematic block diagram of a computer system that is used for explaining prior art practice in regard to functions performed by the central processor and peripherals in processing large volumes of data.

FIG. 1B is used to illustrate that the shared memory data buffer B1-2 of FIG. 1 can have plural partitions or sections.

FIG. 2 is a schematic block diagram, similar in format to that in FIG. 1 but illustrating the signalling functions of central processor and peripherals in the handling of a data streaming operation in accordance with the present invention.

FIG. 9 illustrates the format of an Open Stream Request block that is an element of control information furnished in accordance with this invention.

FIG. 9a shows details of an "open stream parameters" field contained in the Open Stream Request element.

FIGS. 10–15 show formats of various descriptor subfields that can be contained in an "open stream parameters" field. FIG. 10 shows a "buffer group descriptor" subfield. FIG. 11 shows a "buffer descriptor" subfield. FIG. 12 shows a "buffer notification descriptor" subfield. FIG. 13 shows an "input signal code descriptor" subfield. FIG. 14 shows a "synchronization descriptor" subfield. FIG. 15 shows a "transform descriptor" subfield. Parts and functions of these subfields are given in the detailed description.

FIG. 16 shows the format of a buffer control request element that is part of the control information furnished in accordance with the invention.

FIG. 16a shows the format of a buffer control parameters field contained in the buffer control request element.

FIG. 17 shows the format of a buffer synchronization control request element that is part of the control information of the invention.

FIG. 17a shows a "synch control parameters" field that is contained in the control element of FIG. 17.

FIG. 18 shows the format of a stream control request element in accordance with the invention.

FIG. 18a shows details of the stream control parameters field contained in the request element of FIG. 18.

DESCRIPTION OF THE ILLUSTRATIVE EMBODIMENT(S)

Figure 1A:
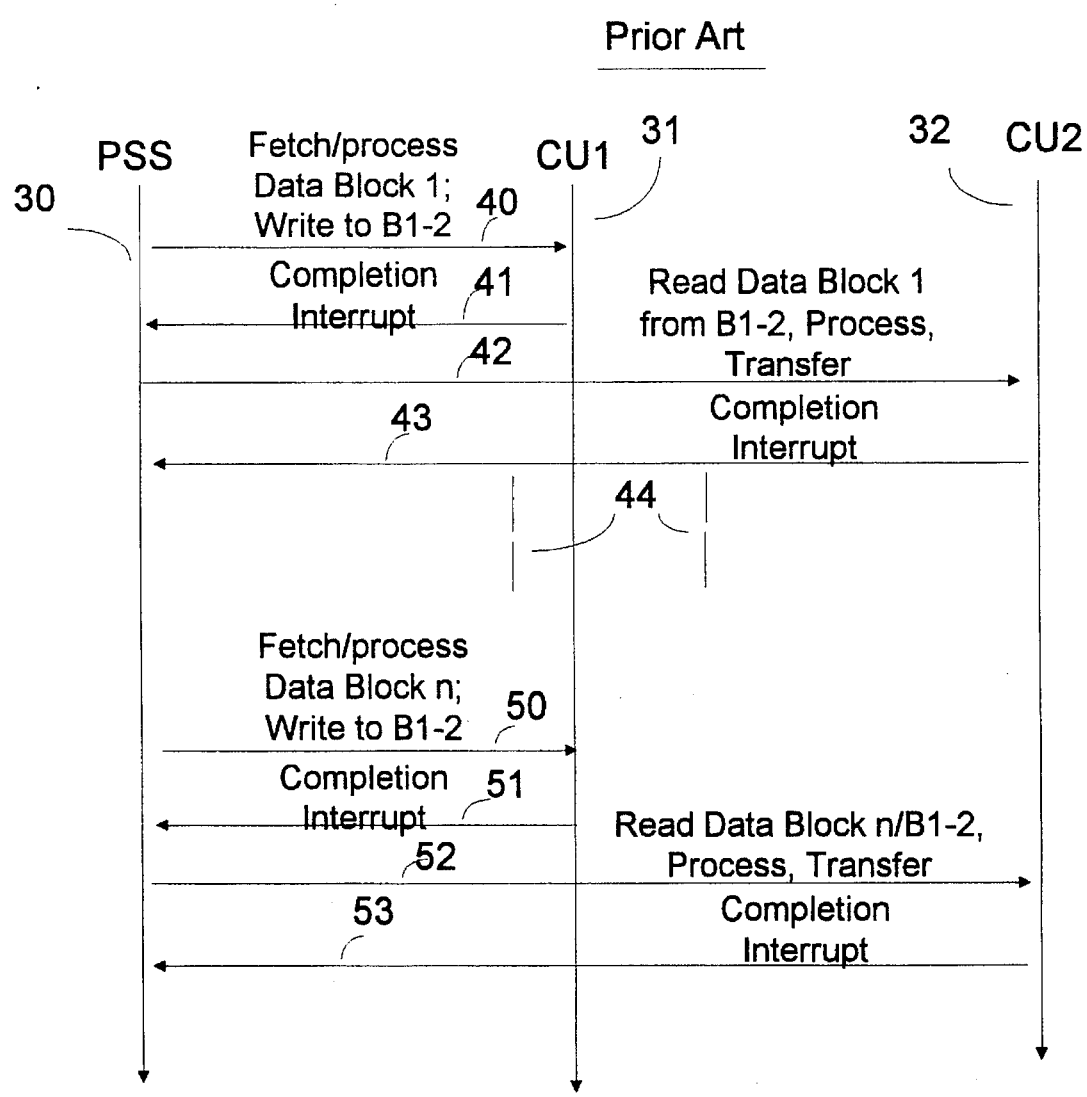
FIG. 1a is a schematic timing diagram used to explain the sequence of operations conducted by the central processor and peripherals in the scheme depicted in FIG. 1.

1. Explanation of Problem to be Solved by the Invention

FIG. 1—a schematic of a conventional computer system with multimedia capability—is used to explain the "interrupt latency" problem solved by the present invention. Processor and memory subsystems are shown collectively at 1, and designated Processor/Memory Subsystem (PSS). Within this subsystem complex a hierarchy of programming entities is used to control movement of data between peripheral devices. These entities may include a device manager subsystem 2, a stream manager subsystem 3, an operating system 4, device drivers 5, 6 associated with specific devices, and "routers" 7–8, for routing signals between the PSS subsystem and devices.

Routers 7–8 are useful for routing formatted control information, between subsystems of a computer system, in accordance with Subsystem Control Block (SCB) architecture concepts described in publication[2] and in the above-referenced patent application by Bonavento et al. In SCB architecture, varied length control elements with predetermined formats are passed between client and server entities, for defining units of work to be conducted by the server entities. In Bonavento et al, the control elements are routed to pipe configurations of enqueued elements, and routers such as those shown here decode destination codes in each element to route the information to appropriate "pipes".

[2]SCB Architecture Supplement to the IBM Personal System/2 Hardware Interface Technical Reference Architectures (Copyright 1991, International Business Machines Corporation)

Although shown as separate boxes here, to avoid obscuring the drawing, these routers actually may be implemented as a single entity (program module) within a processor subsystem such as PSS.

An input-output channel, shown at 10, links the PSS subsystem to device control units shown generally at 12 which control respective devices. Two such control units, 13 and 14, are shown in this figure, along with devices 15 and 16 controlled respectively by unit 13 (CU1) and unit 14 (CU2). Channel 10 has a peer communication feature enabling control units such as 13 and 14 to communicate with each other directly (i.e. without intervention of parts of PSS). A suitable channel facility with a feature of this kind is the IBM Micro Channel[3].

[3]Micro Channel is a Trademark of the International Business Machines Corporation.

CU1 has an associated router 13a which, when CU1 is sending control elements to pipes in other parts of the system, serves to route such elements to appropriate pipe destinations (e.g. parts of PSS and/or other control units like CU2). Likewise, CU2 has an associated router 14a directing its control element communications to pipes in PSS and in other control units like CU1.

Devices 15 and 16 are assumed to be involved in an operation involving successive processing of large amounts of data; first by device 15 and then by device 16. Data buffer 17 (designated B1-2), shared by these devices, receives data processed by device 15 and supplies the data to device 16. Preferably, buffer B1-2 is contained in the memory subsystem of PSS, but is shown separately in the present drawings for simplicity (B1-2 also could be a dedicated memory buffer, used only by the devices 15 and 16, without necessarily affecting the operation of the present invention).

As noted above, the peer communication feature of channel 10 allows control units and other peripheral equipment to inter-communicate directly. In such inter-communication, bus mastership is assumed alternately by central processor, memory and peripheral subsystems of the computer system.

When peripherals have master control of the bus they communicate directly with either the memory subsystem, the processor subsystem or other peripherals. When the processor controls the bus it communicates usually with peripherals and outlying portions of the memory subsystem. When the memory subsystem controls the bus, it acts through either a Direct Memory Access (DMA) controller to communicate with devices or through a Memory Controller to communicate with outlying components of the memory subsystem.

FIG. 1A illustrates conventional handling of data transfer processes involving movement of a large amount of data from device 15/CU1 to B1-2, and from B1-2 to device 16/CU2. A large amount of data in the present context is an amount which could exceed the capacity of B1-2 by several orders of magnitude.

In this figure, vertical lines 30–32 represent time, increasing progressively in the downward direction, and horizontal lines depict specific actions. Horizontal lines emanating from vertical line 30 (terminating in arrows pointing to other vertical lines) depict actions originated by PSS. Horizontal lines emanating from vertical line 31 depict actions originated by CU1 or device 15. Horizontal lines emanating from vertical line 32 depict actions controlled by CU2 or device 16.

As shown at 40, the operation is started by a command from PSS to CU1 and device 15 directing them to fetch a first of n blocks of data from a source designated by the command (which could be in the memory subsystem or in another device such as a CD-ROM), process the block and write the result to shared buffer B1-2.

This is followed by not-shown actions in which the commanded operation is performed by CU1 and device 15. As shown at 41, when these actions are completed (successfully or unsuccessfully), CU1 presents a completion interrupt signal to PSS. At some indefinite time after receiving this signal (depending upon its current task load, etc.), PSS controls the channel to retrieve status information from CU1 and device 15.

After recovering the status information associated with the interrupt received at 41, and assuming that the information indicates successful completion of the operation initiated at 40, PSS acts at 42 to command CU2 and device 16 to process the data block placed in B1-2. Then CU2 and device 16 perform a respective process and conclude with another completion interrupt signal from CU2 to PSS shown at 43. In this process, data is read from B1-2, processed, and sent to a destination specified in the command given at 42 (either to another block of shared memory, to a block of unshared memory, or to a specific output device such as a display monitor or loudspeaker). After an indeterminate delay following receipt of the interrupt signal presented at 43, PSS recovers associated status information from CU2 and device 16.

Assuming this status indicates successful completion, the processes just described are repeated relative to other blocks of data (second, third, . . . , n-1st), one block at a time; with this repetition intended to be suggested by broken vertical lines 44. In a final repetition, indicated by horizontal lines 50–53, a last or nth block of data is processed by CU1, written to B1-2 and the result processed by CU2 and written to a defined destination.

It should be appreciated that n can be an unknown and very large number, and that the cumulative delays associated with the handling of the (2 times n) completion interrupts in PSS can be very long.

FIG. 1B shows that B1-2 can have two or more sections. B1-2A, B1-2b. These could be separately filled by CU1's device 15 and emptied by CU2's device 16. Those skilled in the art will understand that such partitioned buffers are subject to concurrent (although not necessarily instantaneously simultaneous) access, for enabling devices such as 15 and 16 realize higher data throughput; i.e. PSS could initiate an action by CU1 relative to B1-2A while CU2 is performing an operation relative to data previously placed in B1-2B. Accordingly, PSS might not have to wait for completion interrupts and status from CU2 before starting the handling of a next data block by CU1.

However, there would still be cumulative delays associated with the handling by PSS of completion interrupts from at least CU1, for each block of data processed, which would adversely affect the efficiency of the entire operation. Also, there would still be the processing burden carried by PSS of collecting and analyzing the block completion status functions which would detract from time that PSS otherwise could give to other tasks.

The present invention seeks to eliminate the delays associated with PSS handling of block completion interrupts, as well as to offload from PSS much of the processing burden associated with its handling of block completion interrupts.

2. Data Stream Handling in Accordance with the Invention

FIG. 2 illustrates a system like that in FIG. 1, but which is adapted for handling data streams (large volumes of data) through plural devices more efficiently than the system of FIG. 1.

In this arrangement, the signalling paths 56 and 57, which respectively link the host system PSS to device control units CU1 and CU2, are used only to initially prepare the control units for a data streaming operation that they are to handle in coordination, and "autonomously" (i.e. without interrupting or interacting with PSS after the operation is initiated). In that operation, CU1 and CU2 direct operations of respective devices relative to a stream of data with arbitrary length, that data passing "piecemeal" through a shared buffer B1-2 which could not simultaneously hold all of the data.

The data is processed to conclusion, first by CU1's device 15 and then by CU2's device 16, without interruption of PSS. At the conclusion of the streaming operation, that event and its status are communicated to PSS via an interrupt.

During the operation, CU1 and CU2 use the direct/peer communication feature of channel 10 to notify each other of events pertaining to buffer B1-2 (e.g. a section having data available for further processing by device 16, or a section becoming available to received data from device 15, since its previous data has been read and processed by device 16). These notification communications, enabling the CU's to coordinate usage of the buffer sections, can take the form of either formatted control elements transferring from a pipe in CU1 to a pipe in CU 2, or signals which are directed to a specific register in CU2. When the communications are directed to pipes, they are handled through the routers 13a and 14a. When the communications are signals to registers, these routers may be bypassed.

When forwarding control signals to CU2, to indicate filling of portions of B1-2 with data, CU1 (or router 13a) assumes master control of the bus containing channel 10 and either directly writes control signals to a register in CU2 or routes a formatted control element to a pipe in CU2 via router 14a.

Figure 2A:
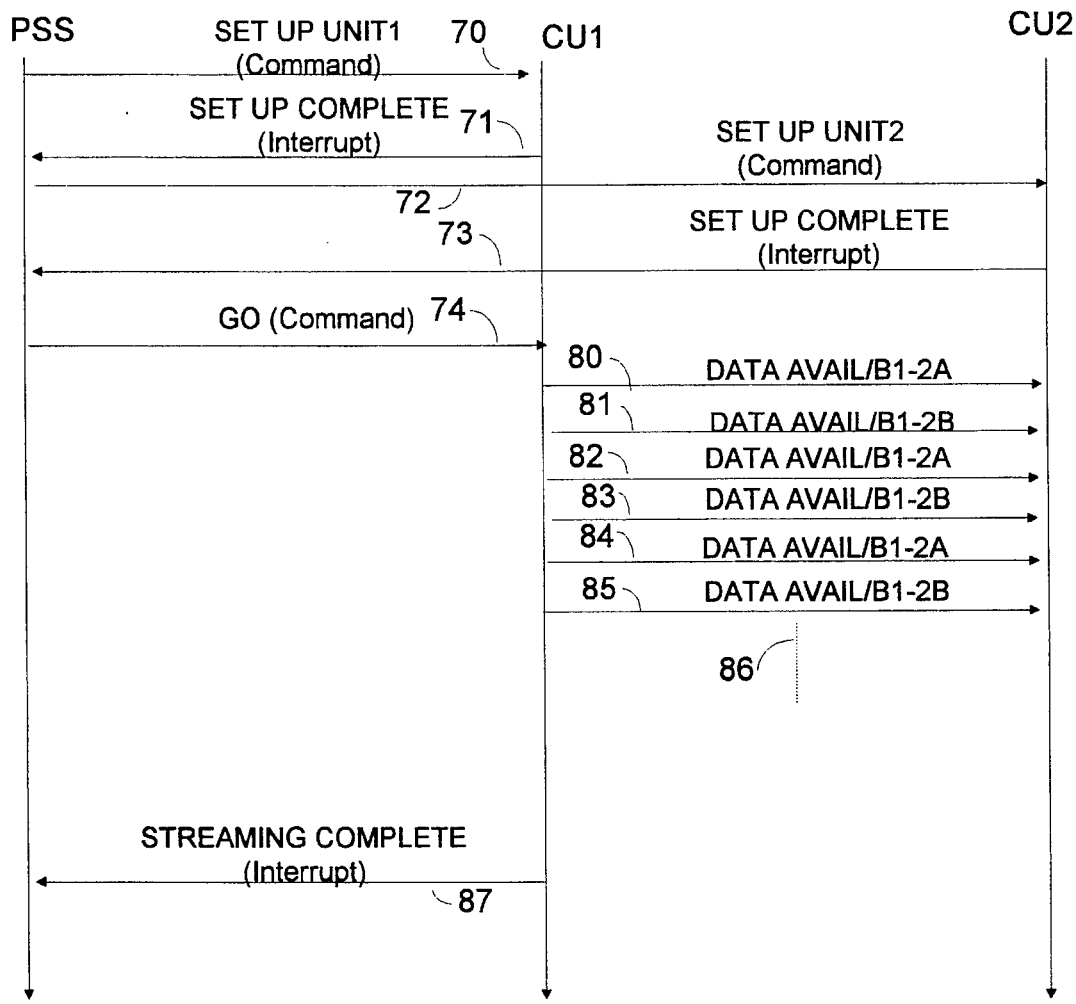
FIG. 2a is a timing diagram used to explain the sequence of operations performed by processor and peripherals in conducting a data streaming operation in accordance with the present invention.

The properitoneal functions performed by PSS, and the streaming operation performed (autonomously) by the control units and respective devices, are described in a general sense with reference to FIG. 2A. Specific forms of properitoneal control information furnished by PSS to the control units, and of control signals furnished by CU1 to CU2, will be described later.

FIG. 2A, like FIG. 1A, uses vertical lines to represent time and horizontal lines emanating from the vertical lines to indicate actions performed by PSS and each of the control units.

At 70, PSS provides one or more commands to CU1 to prepare the latter for a streaming operation and to define the operation (buffer spaces to be used in the memory subsystem as a shared data buffer), source of data to be retrieved and processed by device 15, etc. At 71, PSS receives interruption status from CU1 indicating either that CU1 is ready to begin the streaming operation or was unable to complete its preparation.

At 72, PSS directs one or more commands to CU2 to prepare it for the same streaming operation and to define the operation (buffer space to be used as B1-2, destination of data processed by device 16, etc.). At 73, PSS receives interruption status from CU2 indicating the latter's status (ready or unprepared).

If other control units are involved in the streaming operation, they too will receive setup instructions from PSS and signal readiness status via interrupts to PSS. If any interruption status returned to PSS indicates that a control unit is unable to complete preparation for the streaming operation, the setup process is aborted and the streaming operation is not started.

The commands used to set up each control unit may be provided to the control units via the pipe signalling technology disclosed in the application by F. Bonavento et al cross-referenced earlier.

Assuming all control units have indicated ready status, PSS provides a GO signal at 74 to initiate the streaming operation. This signal is provided only to the control unit or units which are required to perform the first actions in the streaming operation; in this case, the signal is given to CU1 whose device 15 will be required to begin fetching data blocks from a designated source, process the data and write result data to B1-2 for further handling by device 16 associated with CU2.

Actions occurring successively, in processing the first 6 blocks of data in the streaming operation, are suggested by horizontal lines 80 through 85; and subsequent actions relative to additional data blocks are suggested by broken vertical line 86.

In reference to actions 80–86, it is assumed that shared memory buffer B1-2 contains plural block storage sections B1-2A, B1-2B, etc. (see FIG. 1B).

At 80, CU1 signals CU2 to indicate availability of a first block of data in portion B1-2A of shared memory buffer B1-2 (it being understood that prior to this signal device 15 associated with CU1 has processed a corresponding first block of data and written the result block to B1-2A).

At 81, CU1 signals availability of a second block of data in portion B1-2B of B1-2 (with the implication that prior to this signal such data has been written to B1-2B by device 15). At 82–86, CU1 signals availability of third, fourth, . . . , blocks of data alternately in B1-2A and B1-2B.

The signals given at 80–86 may be conveyed either in the pipe form taught in the cross-referenced application by F. Bonavento et al or as direct signals (instantly decoded by CU2), depending upon time constraints on the actions required to be performed by CU2 and its device 16.

After each signal indication 80–86, CU2 is responsible for controlling device 16 to read the associated block of data from the designated portion of B1-2, process it and transmit the result data to a destination defined in the initial preparation of CU2. Optionally, depending upon time constraints imposed on CU2 and device 16, CU2 may be required to return signals to CU1 as each portion of B1-2 is emptied by actions of device 16.

Throughout all of the actions 80 through 86, CU1, CU2 and respective devices act autonomously (without interrupting PSS or receiving further guidance or control from that system).

After a last data block has been processed by device 15 (which may be determined by that device from signals appended to the end of that block at the source or from a count function provided at initial preparation of CU1, etc.) CU provides a completion interrupt signal to PSS (action 87), enabling PSS to subsequently recover completion status from CU1 and device 15 as well as from CU2 and device 16. Optionally, CU2 may be required to provide a separate completion interrupt to PSS when its device 16 concludes its assigned operations.

3. Surrogate/Virtual Control Units and Devices

Figure 3:
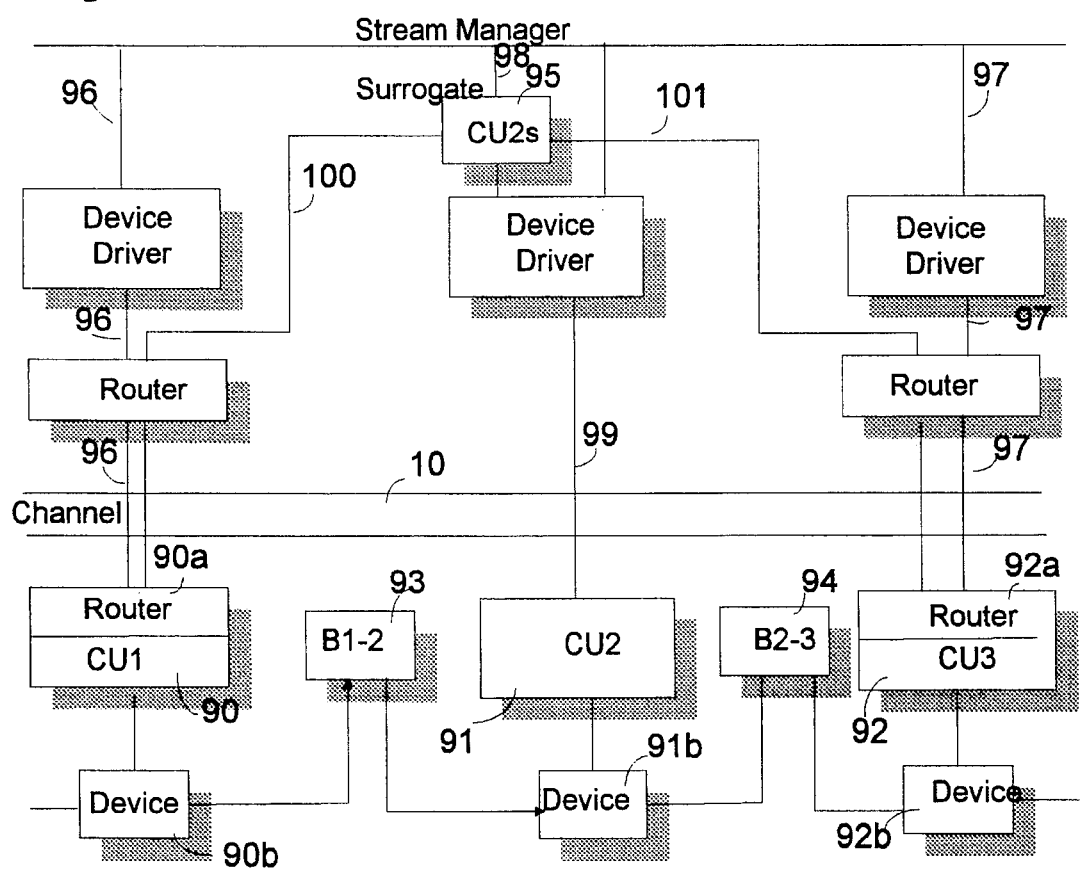
FIG. 3 is a schematic block diagram illustrating use of a surrogate (or virtual) control unit, emulated in a central processor subsystem, to interface to control units that are not architected for interpreting control information in accordance with the invention (e.g. pre-existing control units); so that a surrogate unit acting in combination with an "unarchitected" control unit appears to function as properly architected control unit (relative to other control units involved in a streaming operation).

From what has been indicated so far, it should be apparent that control units participating in the streaming actions described must be logically equipped to be set up by a host system PSS, and, after initiation of at least a first device by that system, such units must be adapted to carry out the signalling functions required relative to other control units cooperating in the streaming process without further input from the host system. In some instances, users lacking such device control units may desire to have their functions emulated in the host system. The arrangement shown in FIG. 3 illustrates this point.

Device control units 90, 91, and 92, along with respective routers 90a, 91a and 92a, and devices 90b, 91b and 92b, are supposed to be sequentially involved in a streaming operation. In that operation, devices 90b and 91b will share memory data buffer 93 (B1-2), and devices 91b and 92ba will share memory data buffer 94 (B2-3). However, assume that control unit 91 lacks the logical capabilities for interpreting setup commands furnished by PSS, and of acting autonomously relative to the other two control units in respect to the streaming process per se.

In that event, a simulated or surrogate control unit 95 (CU2s), provided as a program module in PSS, would receive initial setup commands from PSS, and cooperate with control units 90, 91 and 92 to carry out the autonomous control aspects of the streaming operation that control unit 91 itself is unable to perform.

During the setup part of the process, control units 90 and 92 receive appropriate setup commands and return readiness indications via respective signal paths 96 and 97; and surrogate control unit 95 receives its commands and returns a readiness indication via the path 98. It should be apparent then that the physically real control units 90 and 92 are initialized via the channel 10, and surrogate control unit 95 receives its commands by a process that is wholly internal to the PSS complex, determines its "readiness" by communicating with control unit 91, router 91a, and device 91b through the channel, and then reports its readiness status by an interruption process wholly internal to the PSS complex. In determining readiness, surrogate unit 95 communicates with control unit 91 via signal path 99 and channel 10.

When all of the control units are ready, PSS initiates the streaming operation by means of a GO signal to the first control unit 90 (CU1) and device 90b begins processing blocks of data fetched from a designated source and writing result data to portions of buffer B1-2. As each buffer portion becomes full, control unit 90 issues a DATA AVAILABLE communication (see FIG. 2A) to notify surrogate control unit 95 of this event. The notification is in the form of a formatted SCB element that is directed by router 90a to a pipe in PSS which is assigned to surrogate control unit 95; i.e. the information in this notification is conveyed over signal path 100 to surrogate control unit 95.

For each such notification, surrogate control unit 95 communicates with control unit 91 to set up a conventional command in the latter for having device 91b process a block of data in a specified respective portion of buffer 93, and transfer result data to a specific portion of buffer 94 that is shared by devices 91b and 92ba.

As device 91b finishes handling each such data block, control unit 95 receives a completion indication from control unit 91 via path 99 (via an interrupt or direct signalling process), and immediately presents a DATA AVAILABLE signal to control unit 92, via path 101 through channel 10. The last mentioned signal causes control unit 92 to initiate processing of the respective data block in the autonomous manner described previously.

The amount of program code required to implement such surrogate control components is not large, and since the code could easily be adapted to serve multiple devices (e.g. by a "front end" segment common to a class of devices and plural "back end" segments tailored to specific device drivers), it could be an attractive commercial resource to offer to system users.

4. Emulation of Control Unit and Device for Streaming

Figure 4:
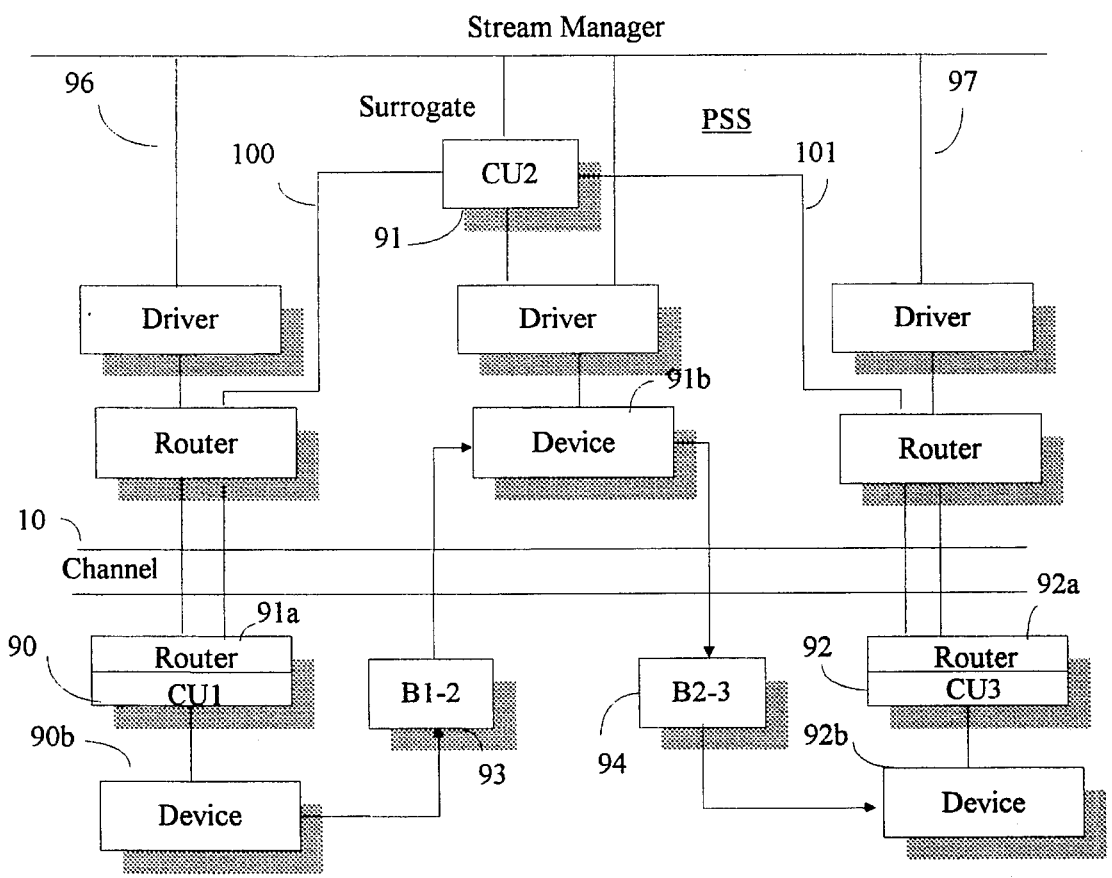
FIG. 4 is a schematic block diagram illustrating the functional shifting of a stream processing function from a peripheral device into a virtual device emulated in the central processor subsystem, to have both surrogate control and selected stream processing functions performed in the processor subsystem. This type of arrangement is useful to provide stream processing functions to users of a computer system at potentially less cost (but slower) than could be obtained from devices external to their systems, or to provide stream processing functions that are not implemented in stand-alone devices.

FIG. 4 illustrates how the arrangement of FIG. 3 can be further modified to shift all device and device control functions associated with one device into a virtual device/control unit program element of PSS.

The arrangement of FIG. 4 is functionally the same as that in FIG. 3. However, in FIG. 4, the control unit 91 is wholly integrated into the surrogate controller shown as element 95 in FIG. 3 (i.e. in FIG. 4, the entire control unit 91 is implemented as software routines executable in PSS), and device 91a in FIG. 4 is also implemented entirely by routines executable in PSS.

The operation of the arrangement in FIG. 4 is basically the same as the one in FIG. 3, except that communications between control unit 91 and device 91a are conducted as internal functions of PSS (they do not go through the channel 10) and the program modules representing unit 91 can be organized for fully autonomous streaming operation (i.e. it communicates only with units 90 and 92 during a streaming operation and need not furnish status to e.g. the streaming manager in PSS until the entire operation is completed (or aborted).

5. Multiple Concurrent Streaming Operations

Figure 5:
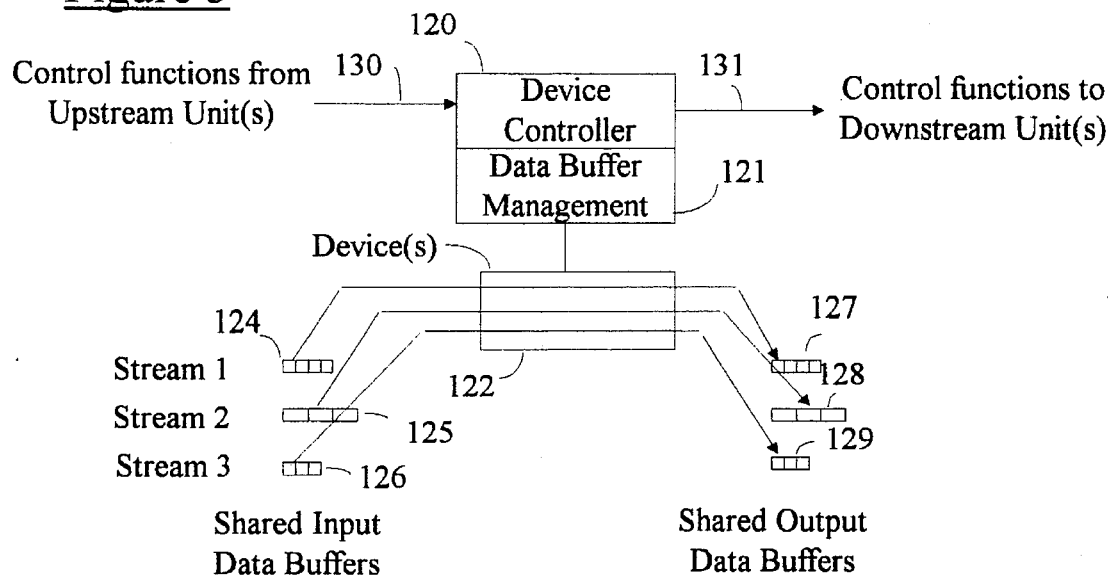
FIG. 5 provides a schematic overview of control information movement and stream data movement, as viewed by a device, and also shows that a single device may concurrently support processing of multiple data streams. This figure is also used to describe how a single data stream may be partitioned into multiple streams or how multiple streams could be merged into a single stream under appropriate circumstances.

FIG. 5 provides an overview of control signal and data movement as viewed by a single device and device control unit. In addition, this figure shows that one control unit and device can be used to sustain multiple streaming operations concurrently. Although not shown in this figure, it will be readily understood that several streams could be combined into one stream, or one stream could be broken up into several streams depending upon the processing functions performed by the device relative to such streams.

Device controller 120 interacts with data buffer management facility 121 to control one or more devices 122 for processing three data streams identified as streams 1–3 in the figure. Data contained in these streams is transferred to the device 122 from input buffers 124–126 that may be part of PSS memory, and that may be shared between device 122 and an "upstream" device that writes the data to the buffers. Data resulting from operations of device 122 are written to output buffers 127–129 that may be shared with a "downstream" device required to handle the data generated by device 122.

In this figure, stream 1 passes through input buffer 124 and output buffer 127; stream 2 passes through input buffer 125 and output buffer 128; and stream 3 passes through input buffer 126 and output buffer 129.

With respect to these streams, controller 120 is of course prepared by setup command information received from PSS. Controller 120 also receives input control functions at 130, from not-shown upstream control unit(s), and supplies output control functions at 131 to not-shown downstream control unit(s).

As will be shown later, the set up commands may be formatted in accordance with the now-published subsystem control block (SCB) architecture mentioned earlier; and these commands typically would include at least commands to "open" a stream (i.e. prepare for a new streaming operation), commands to "suspend" or "stop" a stream (e.g. to allow for a user to interject a pause in or completely halt a motion picture presentation), and commands to "resume" a previously suspended or stopped stream operation.

The controller 120 and facility 121 may be integral parts of a single control unit or device adapter entity.

Communications between the illustrated arrangement and control units upstream and downstream of that arrangement are carried out in a manner such that the upstream and downstream units are unaware that they may be communicating with virtual devices implemented in host system routines.

6. Use of FIFO for Shared Data Buffering

Figure 6:
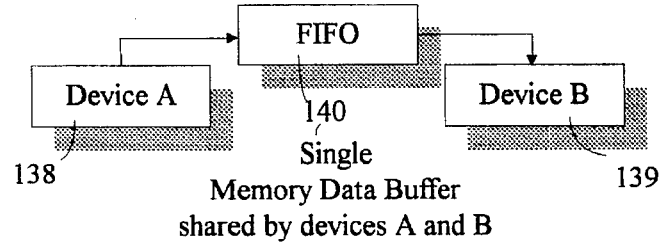
FIG. 6 is used to explain how multiple data buffers shared between a communicating pair of stream processing units could be replaced by a single FIFO (first in first out) buffer.

FIG. 6 shows that the buffer shared by two devices, devices A and B respectively shown at 138 and 139, may be a FIFO (first in first out) memory arrangement as suggested at 140. An advantage of this type of arrangement is that it eliminates the need for passage of control information between the controller of source device A and the controller of destination device B; inasmuch as control is implicit in this kind of arrangement (i.e. it is assumed that the buffer is always capable of receiving data, and therefore device B is required to process data (in first in first out sequence) whenever the buffer is not explicitly empty. A disadvantage is that the buffer could be overrun without the source device or its controller receiving any indication of that occurrence.

The FIFO arrangement could be viewed as a species of the buffers described in earlier figures, wherein the buffer is one unit in length (the width of the FIFO) and effectively wraps to itself. If the data transfers to the FIFO occur in bursts with automatic address incrementing, special care must be taken to ensure that enough capacity and continuity of addressing is provided in the FIFO to avoid the possibility of addressing memory not part of the shared buffer.

7. Use of Private Buffer Policy

Figure 7:
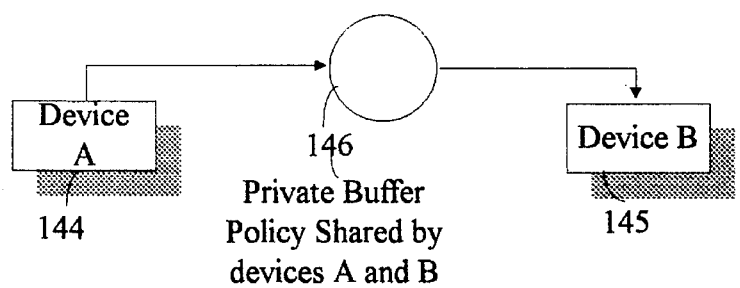
FIG. 7 is used to explain how directly communicating stream processing devices can be adapted to use a private buffer policy to manage storage of stream data passing between them, which can be particularly effective when such devices and their shared buffer reside physically in a single unit.

FIG. 7 shows source and destination devices A and B, at 144 and 145 respectively, sharing a private buffer 146; typically a buffer not allocatable to other devices and preferably a buffer so situated that data is communicated between it and the devices without crossing the channel (reference channel 10, FIG. 2). In this type of arrangement, the devices have a "private" permanent understanding or protocol in regard to the order in which segments or block portions of the buffer are filled and emptied, so that there is no need for passage of control information from source to destination in order to indicate the location of the portion most recently filled.

8. Summary of Possible Inputs and Outputs

Figure 8:
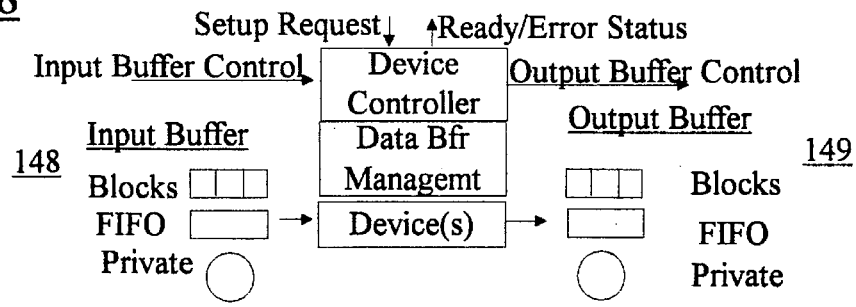
FIG. 8 summarizes all possible inputs and outputs associated with stream processing in accordance with this invention.

FIG. 8 provides a summary view of all possible inputs and outputs (control and data) described in previous sections. Types of possible input and output buffers are indicated respectively at 148 and 149. In order to ensure proper movement of data between devices sharing a buffer a "lowest common denominator" must be agreed to and architected for all devices and associated control units.

A likely choice for buffer configuration would be a simple buffer, in shared system memory, having two portions that are utilized in a "ping pong" fashion (i.e. the source filling the sections alternately and the destination reading them in the same sequence). The decision as to which type of buffer to use and the type of control information that should be passed between source and destination should be made by the Stream Manager using information available to the system when devices are attached to it as to the capabilities of the devices and their control units.

9. Setup Command Formats

The commands (request type control elements) used for setting up the present streaming operations, and descriptor information contained in such requests, is shown in FIGS. 9–18. These requests have a subsystem control block (SCB) architected format similar to what has been described in the cross-referenced patent application by F. Bonavento et al and the published SCB Architecture document footnoted earlier. However, the information content of these objects as used for setting up streaming processes is unique.

Request control elements are one species of SCB architected forms. Other control elements are reply type elements, event type elements and error type elements. Requests are sent from a client/source to a server/destination defining performance of a unit of work. Replies are returned by servers in response to certain types of requests. Event (notification) elements furnish information about the progress of requested work, the state of a request, or the status of a client or server. Error type elements provide error information about requests or about status of a server.

Request elements are used presently to set up streaming operations, and event elements may be used presently in notification communications that pass between control units during the performance of streaming operations.

The requests employed presently to set up streaming are labelled: OPEN STREAM, CONTROL, BUFFER CONTROL, and BUFFER SYNCHRONIZATION CONTROL.

The OPEN STREAM request format is shown in FIGS. 9 and 9a, and formats of descriptor information furnished with this request are shown in FIGS. 10–15. the BUFFER CONTROL request format is shown in FIGS. 16 and 16a. The BUFFER SYNCHRONIZATION CONTROL request format is shown in FIGS. 17 and 17a. The STREAM CONTROL request format is shown in FIGS. 18 and 18a.

9-1. OPEN STREAM REQUESTS

The format of an OPEN STREAM request control element is shown in FIGS. 9 and 9a. This request contains a number of information fields 160–167 described below.

Field 160—contains format identity (Format ID) information serving to identify the type of control element.

Field 161—contains length information defining the length of the request in bytes.

Field 162—contains eight discrete subfields:

REQ (Request)—defines the type of control element (in this case, a request type);

S ("suppress reply")—is a bit indicating whether the client wants the server to return a reply at successful completion of requested work;

C ("chaining")—a bit indicating a chaining linkage between two or more control elements which represent a single unit of work to be processed in the order of their appearance;

I ("indirect")—a bit (valid only in request type control elements) for indicating whether the parameters (or value) field discussed below contains a direct representation of information to be interpreted or pointers to memory locations of such information;

N ("notification bit")—(valid only in request elements) indicating whether the client has or has not requested notification by the server when processing of the respective request element begins;

W ("wait")—bit (valid only in request type elements) indicating if the server is to wait, before processing the respective control element, until the client furnishes a specific "resume" notification;

E ("expedite")—bit which when active indicates that the respective control element is to be handled as soon as possible (possibly before other control elements not containing an "expedite" indication);

OpenStream—(the function code for an OPEN STREAM control element) defines how the parameters field (discussed below) of this request is to be interpreted (other requests and control elements have different function codes);

Field 163—is reserved (e.g. for future expansion of functions).

Field 164—defines the source of the command associated with this request (e.g. the client).

Field 165—defines the destination of the request (i.e. the pipe or other server entity to which the request is to be routed).

Field 166—contains a correlation field used for correlating request and reply control elements.

Field 167—is a variable length parameters (also called "values") field, containing a variable number of descriptors. The descriptors are used presently to define:

1) individual buffers that make up a buffer group (a group of shared input or output buffers)

2) the buffer management policy (how the buffers are to be managed by CU's that control sharing devices).

3) the notification policy of each (input and output) buffer (i.e. the CU's or other entities, if any, that are to be notified when the respective buffer contains data available to be processed or when the respective buffer is available for refilling with new data, etc.).

4) the buffer synchronization policy; i.e. events, possibly in the handling of a different stream, or other conditions (in addition to an availability notification from an "upstream" CU), that are to trigger processing of data in a buffer.

5) the correlation between input and output data handled by the respective device (i.e. the transformation process, if any, to be performed on the input data by the device reading that data).

The descriptor formats are shown in FIG. 9a. Each descriptor contains sub-fields 169–172 used as follows:

Subfield 169—contains information defining the descriptor type (see discussions of FIGS. 10–15 to follow);

Subfield 170—contains information defining the length of the respective descriptor (e.g. in bytes);

Subfield 171—is reserved;

Subfield 172—contains the descriptor information (the information specific to and dependent on the respective descriptor).

The type and length subfields are unique for different types of descriptors. The number of descriptors in any OPEN STREAM request is variable (depends on the number of buffers defined, the number of notifications required for each buffer fill/empty event, and the type of signalling to be used for notification).

The types of descriptors which may be provided in such requests are: a Buffer Group descriptor (shown in FIG. 10), a Buffer descriptor (FIG. 11), a Buffer Notification descriptor (FIG. 12), an Input Signal Code descriptor (FIG. 13), a Synchronization descriptor (FIG. 14), and a Transform descriptor (FIG. 15).

The order of descriptors in the Parameters Field 167 must adhere to a predefined rule so as to facilitate parsing of the subfields by the device. An appropriate set of rules is:

A) a Buffer Group descriptor must be followed by at least one Buffer descriptor; B) a Buffer descriptor may be followed by one or more buffer notification descriptors;

C) an Input Buffer group (if present) must be defined before an Output Buffer group (if present);

D) all Input Signal Code descriptors (if present) must follow Output Buffer Group descriptors;

E) a Synchronization descriptor (if present) must follow the Input Signal Code descriptor;

F) a Transform descriptor (if present) must follow the Synchronization descriptor.

The Buffer Group descriptor (FIG. 10) is used to define a group of buffers which are to be used and managed collectively as a shared input or output buffer (each single buffer or group component part serving e.g. to hold a block of data, and the parts collectively being filled or emptied in some predetermined order). The information fields contained in this type of descriptor (FIG. 10) are:

Byte 0-1: x'010C' (the code identifying this type of descriptor);

Byte 2-3: reserved;

Byte 4-5: identity (ID) of a respective Buffer Group;

Byte 6-7: reserved;

Byte 8: number of buffers in the group;

Byte 9: flags for:
Input/Output control
Buffer Management Policy (Circular, FIFO, private, etc.)
error reporting policies;
error recovery policies;

Byte 10: Relative Stream Priority (the processing priority of a stream flowing through this buffer group over other streams);

Byte 11: Reserved.

The Buffer descriptor (FIG. 11) is used to define a Buffer that is a component part of a Buffer Group. This descriptor contains:

Byte 0-1: x'0214' (the code value specific to this type descriptor);

Byte 2-3: reserved

Byte 4-5: Buffer Group ID (see above);

Byte 6-7: Buffer ID (identity of the particular buffer described in this descriptor);

Byte 8-11: buffer address (32 bits defining an initial location for this buffer in the memory address space of the system);

Byte 12-15: buffer length (in bytes);

Byte 16: Flags for:
  Input/Output control;
  Notification buffer full (output buffer only);
  Wait for buffer to empty (output buffer only);
  Notification buffer empty (input only);
  Wait for buffer to fill (input only);

Byte 17-19: reserved

The Buffer Notification descriptor (FIG. 12) defines which devices to notify when a buffer reaches a boundary condition (full, representing data available to be processed, or empty, representing that all data in the buffer has been processed). Elements of this descriptor are:

Byte 0-1: x'030C' (the code uniquely identifying this type of descriptor);

Byte 2-3: reserved;

Byte 4-5: Buffer Group ID;

Byte 6-7: Buffer ID;

Byte 8-9: Flags for:
  Bit 0—all buffers/Buff ID only (indication that notification should occur for all buffers in the group as opposed to only a single particular buffer in a group);
  Bit 1—Signal/Event (indicates if notification should be in the form of a signal (e.g. a communication directly addressed to a register in the destination CU) or an SCB formatted event control element;
  Bit 2—Notify on buffer full;
  Bit 3—Notify on buffer empty;
  Bit 4—Notify on error (recoverable);
  Bit 5—Notify on error (non-recoverable);

Byte 10: (if applicable) indicates a Signal Code to be used when notifying the other unit via a directed signal; or, the unit address (destination) to use to send an event if Bit 1 is set to "event".

Byte 11: I/O Port Address (the address in system I/O space of the specific register or other entity to which a notification signal is to be directed, when such signalling is applicable) or, the entity address (destination) to use to send an event if Bit 1 is set to "event". The Input Signal Code descriptor (FIG. 13) defines the signal codes that are to be received by the device to which the descriptor is directed. The contents of this descriptor are:

Byte 0-1: x'040C' (the code value uniquely identifying this type of descriptor);

Byte 2-3: reserved;

Byte 4-5: Buffer Group ID;

Byte 6-7: Buffer ID;

Byte 8: Flags for:
  Bit 0—all buffers ID only (see previous definition of this);
  Bit 1—to indicate Output Buffer empty;
  Bit 2—to indicate Input Buffer full;

Byte 9: reserved;

Byte 10: Signal Code (for indicating a signal code to be used for direct signalling notification, when applicable);

Byte 11: I/O Port Address( in system I/O address space of register or other entity to receive a signal notification, when applicable).

The Synchronization descriptor (FIG. 14) defines how the respective Buffer Group of the targeted device is to be synchronized with other streams (e.g. how a Buffer Group processing a video stream is to be synchronized with the separate handling of an audio stream) or timers. Contents of this descriptor are:

Byte 0-1: x'0510' (the code uniquely identifying this type of descriptor);

Byte 2-3: reserved;

Byte 4-5: Buffer Group ID;

Byte 6-7: reserved;

Byte 8: Flags for:
  No Synchronization (Sync);
  Sync Source is in stream;
  Sync Source is timer;
  Sync associated with pre-arranged delivery/consumption rate;

Byte 9: defines delivery/consumption rate (see last flag above);

Byte 10-11: reserved;

Byte 12-15: Stream ID or Timer Address (used in conjunction with flags to locate the synch source; i.e. the source of timed functions defining the pace at which input data is to be processed).

The Transform descriptor (FIG. 15) defines the relationship between input and output data to be handled by the device to which the descriptor is directed (i.e. the process, if any, to be performed by the device on the input data it receives). Contents of this descriptor are:

Byte 0: x'06' (the code value uniquely identifying this descriptor);

Byte 1: length of descriptor (in bytes);

Byte 2-3: reserved;

Byte 4-7: Stream Correlation ID (used to identify the function determining synchronization; e.g. other stream, etc.);

Byte 7-x: device dependent control information (x=variable number) including
  Read and Write type commands. The change relative to similarly formatted control elements of other descriptors is to allow source and destination addresses in this area to specify a Buffer Group ID, rather than a memory address representing the physical location of a shared buffer.

9-2. Buffer Control Request

The Buffer Control Request element (FIGS. 16 and 16a) is used in request, reply and error control. It contains the parameters needed to control filling and emptying of buffers within a Buffer Group. Component fields of this request are indicated in FIG. 16, and component subfields of the "Parameters" field of this request are shown in FIG. 16a.

The fields other than the "BufferControl" and "Parameters" field in this request have functions, and positions within the request that are substantially identical to those of correspondingly labelled fields in the OPEN STREAM request (FIG. 9). The "Buffer Control" field contains a code which distinguishes the request as being a Buffer Control type request. The "Parameters" field in the Buffer Control Request contains the following information:

Byte 0-1: Buffer Group ID;

Byte 2-3: Buffer ID;

Byte 4: Flags:
  Bit 0—indicating Output Buffer empty;
  Bit 1—indicating Input Buffer full;
  Bit 2—indicating Output Buffer error (recoverable);
  Bit 3—indicating Output Buffer error (non-recoverable);

Bit 4—indicating Input Buffer error (recoverable);
Bit 5—indicating Input Buffer error (nonrecoverable);

Byte 5-7: reserved;

Byte 8-11: Error Code (Bit 0 distinguishing between recoverable and non-recoverable errors);

Byte 12-15: Residual Byte Count (for indicating the amount of data yet to be processed as a result of an error); only valid in error conditions and should have a zero value during normal operations;

Byte 16: device dependent (for indicating e.g., additional status, error or other).

9-3. Buffer Synchronization Control Request

This request element (shown in FIGS. 17 and 17a), like the Buffer Control request element described in the preceding section, is used in request, reply and error control situations. It contains all information needed to control synchronization of buffers within a Buffer Group. Component fields of this request are shown in FIG. 17, and subfields of the respective Parameters component field are shown in FIG. 17a. Except for the fields labelled "SyncControl" and "Parameters", all other component fields of the Buffer Synchronization Control Request, are essentially identical to correspondingly labelled (and positioned) fields in the OPEN STREAM and Buffer Control requests. The field labelled "SyncControl" contains a code distinguishing this request as a Buffer Synchronization Control type request.

The component subfields of the Parameters field, in the Buffer Synchronization Control Request (FIG. 17a), are:

Byte 0-1: Buffer Group ID;

Byte 2-3: reserved;

Byte 4: Flags for:
  indicating sync to timer;
  indicating sync to stream per se;
  indicating sync to consumption/delivery rate specified in byte 5;

Byte 5: consumption/delivery rate;

Byte 6-7: reserved;

Byte 8-11: Timer address or Stream Correlation ID.

9-4. Stream Control Request

The Stream Control Request is also used in request, reply and error control situations. It contains information needed to control stream processing. Component fields of this request (FIG. 18), other than the respective fields labelled "StreamControl" and "Parameters", are identical to correspondingly labelled fields in the other requests described above. The field labelled "StreamControl" contains a code distinguishing the request as a Stream Control type request. The field labelled "Parameters" (FIG. 18a), in the Stream Control type request, contains the following subfields:

Byte 0-3: Stream Correlation ID;

Byte 4: Stream Command with bits designating functions to be performed immediately by the targeted device and controller:
  Prime Stream (fill buffers but don't begin processing);
  Start Stream (begin processing stream data in buffers);
  Suspend Stream (suspend processing of data in buffers);
  Resume Stream (resume processing after suspension of processing);
  Stop Stream (same as Suspend and Flush);
  Flush Stream (empty buffers without processing the data);

Byte 5: Synch Flags:
  Bit 0—indication to begin immediately;
  Bit 1—begin when Timer value=x;
  Bit 2—begin when Input Buffer is full;

Byte 6-7: reserved;

Byte 8-11: address of Timer value "x" (see byte 5);

Byte 12-15: current timer value;

Bytes 16-xx: optional Transform descriptor (see FIG. 15); "xx" variable.

10. Logical Organization of Control Units For Streaming

Figure 19A:
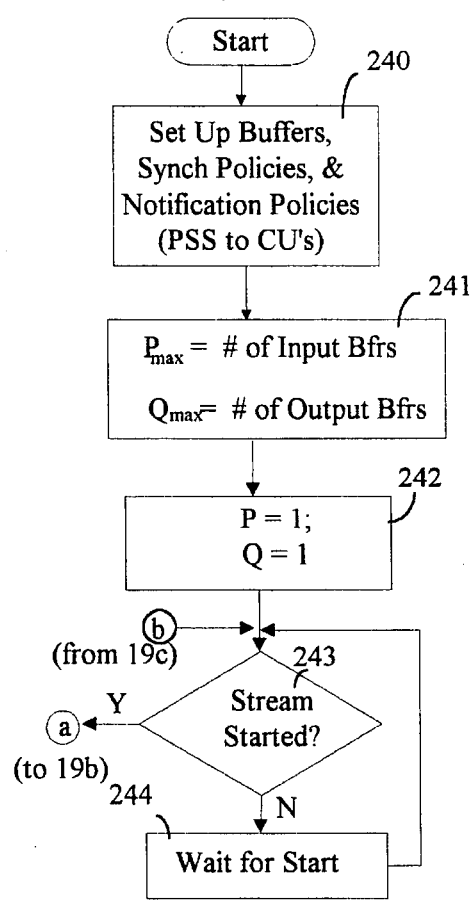
FIGS. 19a, 19b, and 19c contain a flow diagram describing the operations and logical organization of a control unit adapted for data streaming in accordance with the present invention.
Figure 19B:
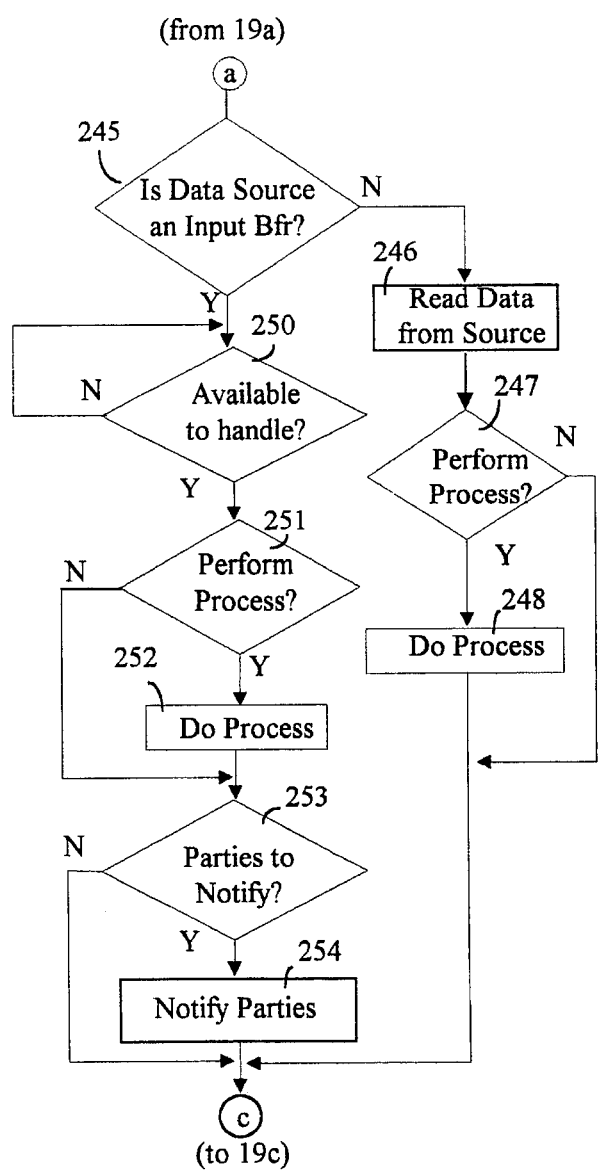
Figure 19C:
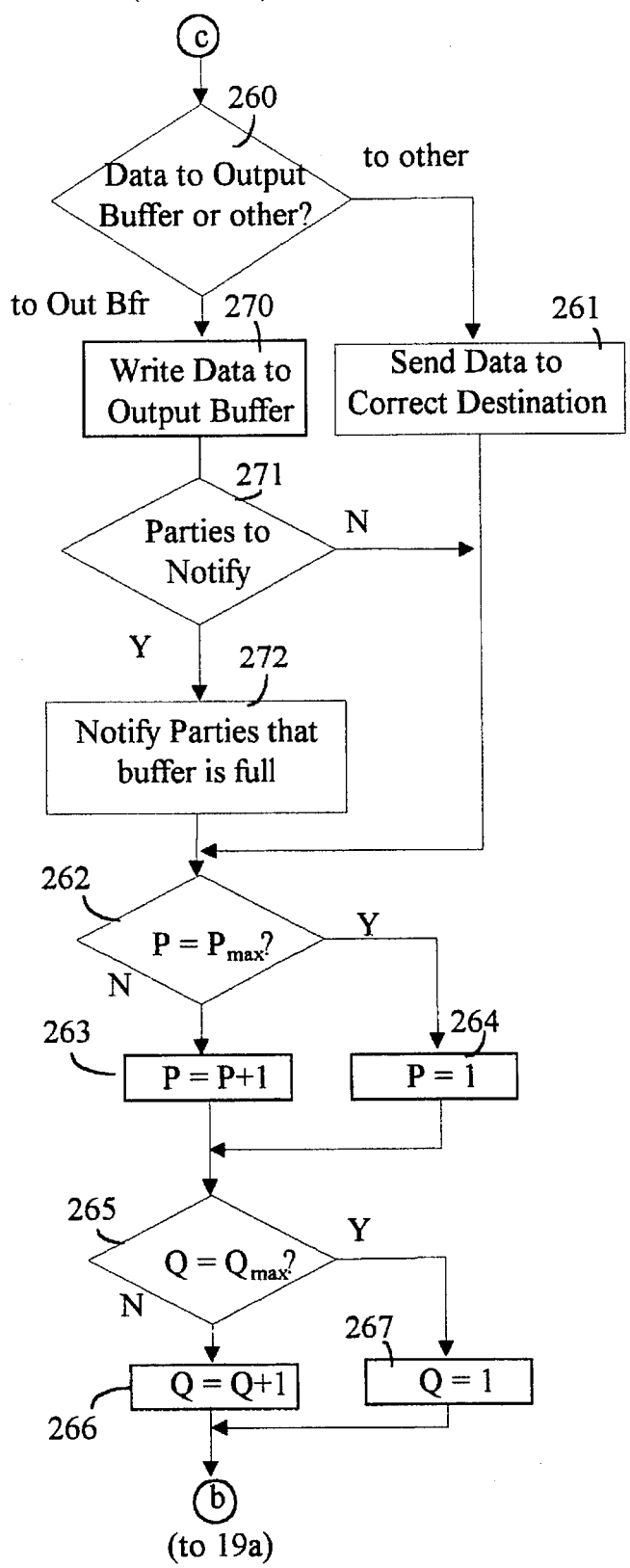
Figure 20:
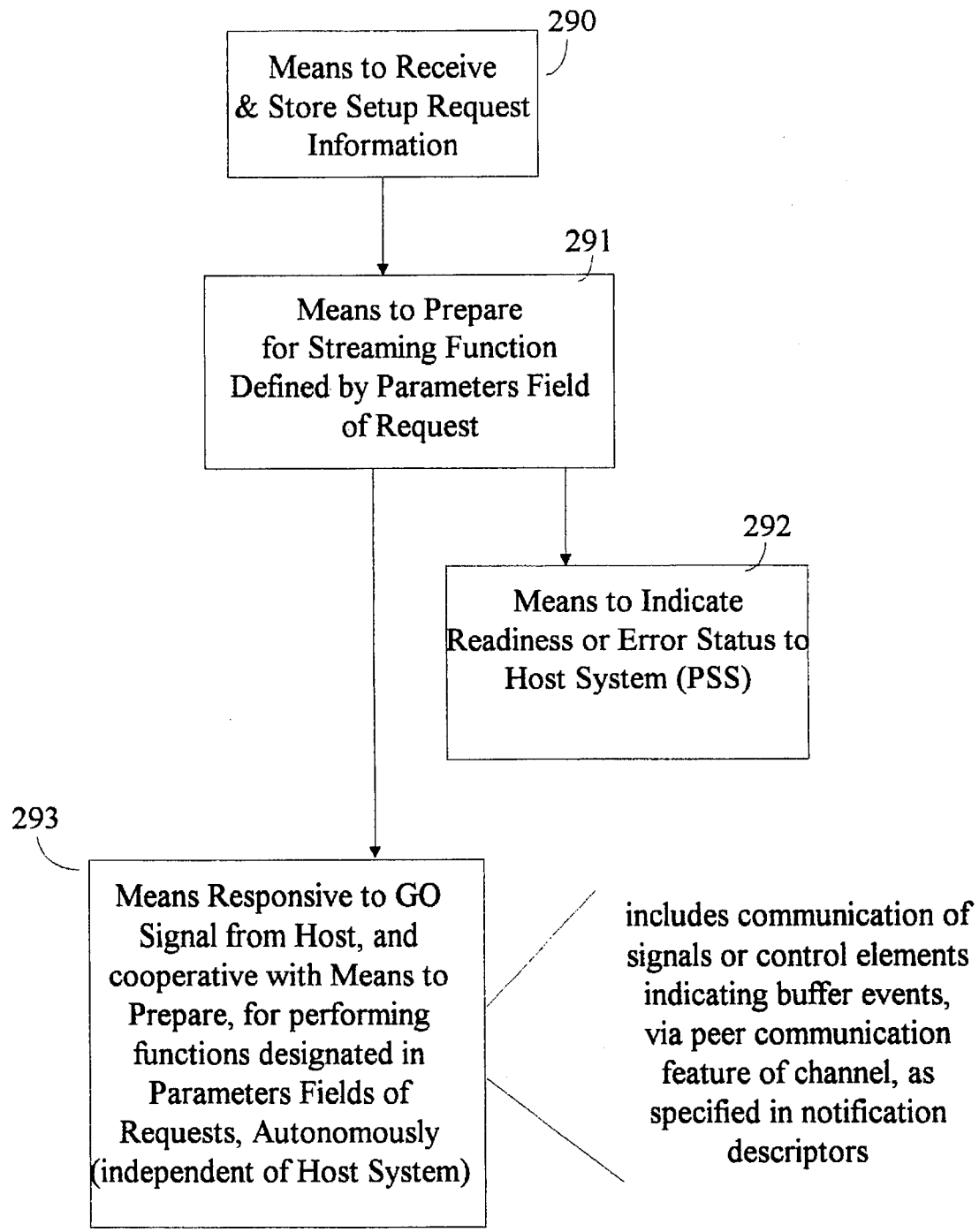
FIG. 20 is a schematic block diagram illustrating logical components of a control unit operating in accordance with the flow diagram of FIGS. 19a, 19b, 19c.

FIGS. 19a, 19b, and 19c contain parts of a flow diagram intended to describe the logical organization of device control units that are adapted in accordance with the invention for carrying out streaming processes. FIG. 20 is a block diagram intended to show logical elements needed for streaming in a broad "means plus function" context.

Connections between FIGS. 19a, 19b and 19c are indicated by letters "a", "b" and "c" enclosed in circles. Thus circled "a" in FIGS. 19a and 19b indicate that an output of the flow segment shown in FIG. 19a links to an input of the flow segment shown in FIG. 19b. Likewise, circled "b" indicates that an output of the flow segment in FIG. 19c links to an input of the flow segment in FIG. 19a. Likewise, circled "c" indicates that an output of the flow segment in FIG. 19b links to an input of the flow segment in FIG. 19c.

The setup phase of the streaming process, as viewed by a device control unit, is shown in FIG. 19a. At stage 240 of this process, the control unit receives requests and descriptors of the type described above, and sets itself to a working configuration defined by these functions. The working configuration includes parameters defining the buffer policies required relative to input data and output data, synchronization policies if required, and notification policies; and conditioning of logic in the control unit to conform to policies defined by these parameters.

As part of this properitoneal phase, at step 241, the control unit conditions its logic to operate with an input buffer group having a variable number of buffers defined by value $P_{max}$, and with an output buffer group having a variable number of buffers defined by value $Q_{max}$. The number of buffers in each group (i.e., the values of $P_{max}$ and $Q_{max}$), and sizes of individual buffers in each group, are defined by information contained in the descriptors received at stage 240. The subscript "max" is a value defining the number of buffers allocated by PSS for each group. It is not meant to connote a "maximum" in the context of for instance defining an upper limit on the number of buffers which could be allocated to a group (although practical circumstances may impose such a limitation on PSS).

Next, at step 242, the control unit sets values of counting functions P and Q, which respectively point to the next input buffer to be processed and the next output buffer to be filled, to initial values 1 (effectively pointing to specific "first" buffers in the input and output buffer groups).

Before advancing to the decision function shown at 243, the control unit signals its status to the processor system (PSS) via interruption. If this status indicates that the control unit is unable to proceed due to error, the process of preparing and initiating the streaming operation is discontinued by PSS (see earlier comments, in the description of FIG. 2A, regarding how status interruptions affect initiation of the streaming operation).

At 243, the control unit determines if the signal to begin stream processing has been received from its host system PSS (e.g. the GO signal from PSS mentioned earlier, or its equivalent in a request calling for immediate resumption of a suspended stream processing operation). When that signal is received, the process advances to the segment shown in FIG. 19b (via link "circled a"); and if the signal has not been received the unit waits a predetermined time (step 244) and repeats determination 243.

In the next segment of the streaming process depicted in FIG. 19b, the control unit determines first, at 245, if the source of input data for its device is an Input Buffer shared with another (upstream) device or a specific other device (such as CD-ROM, tape, hard disk, network port, etc.).

If the source is not an Input Buffer, the respective device is prompted, at 246, to read data from the specific source device. When this action is taken, a determination is made at 247 of whether the data retrieved from the source needs specific process handling or is merely being forwarded to a downstream device. If specific transform/process handling is required, actions 248 are taken to carry out the process (which is defined by one of the requests received at set up phase, FIG. 19a), and the segment is exited to a continuing segment in FIG. 19c, via "circled c". If the determination at 247 is that no transformational processing of the data is required, actions 248 are skipped and the segment exits to the segment of FIG. 19c.

If the determination at 245 is that the source of input data is an input buffer (i.e. a buffer shared with an upstream device), a determination is made at 250 of which buffer (in a buffer group) to process next and the availability status of that buffer (see discussion below, in description of FIG. 19C, of how the counter P is used).

If the input buffer is not available at determination 250, that determination is repeated after a predetermined wait time. If the input buffer contains available data, determination 251 is made to determine if the data in the buffer needs process/transformation handling or simple buffered handling.

If the determination at 251 is that process handling is required, the device is prompted to perform a respective process (defined in the set up requests) at 252, and the segment continues with further actions 253 and 254. If the determination at 251 is that no transformational processing is needed, action 252 is skipped and the segment advances directly to actions 253 and 254.

At action 253, a determination is made as to whether the current state of the input buffer (e.g. buffer "empty" or available for refilling) requires notification of other parties/ device control units. If notification is required, actions 254 are taken to carry out the notifications and the segment exits via "circled c" to the continuing segment of FIG. 19c. If notification is not required, actions 254 are skipped and the segment exits directly to the segment of FIG. 19c via "circled c".

Upon entering the operational segment shown in FIG. 19c, determination 260 is made to determine the destination of data produced in the segment of FIG. 19b; as either a (shared) Output Buffer or a specific device (monitor, loudspeaker, etc.).

If the destination is a specific device, action 261 is taken, to forward the data to that device, followed by selected parts of an action routine indicated at 262 to 267 (explained below), and, when all of the output data has been handled in this manner, followed by re-entry to action stage 243 in the setup segment of FIG. 19a, via the "circled b" linkage.

If the destination of the output data is a specific output buffer, action 270 is performed to write the data to that buffer. This is followed by actions 271 and 272 leading to the actions 262 to 267 mentioned above. In action 271 a determination is made as to whether any parties require notification. If notification is required, action 272 is performed to accomplish the notification. If notification is not required action 272 is skipped and the segment advances directly to action set 262 to 267.

At 262, the value of the count function P. designating the Input Buffer from which data is currently being read, is compared to the maximum value $P_{max}$ established in actions 241 (FIG. 19a). If the value of P is less than that of $P_{max}$, the value of P is incremented by 1 (action 263). If the value of P is equal to $P_{max}$, the value of P is reset to 1 (action 264) to begin reading data from the first input buffer again.

At 265, the value of Q, designating the Output Buffer currently being filled, is compared to the value $Q_{max}$ defining the total number of output buffers currently being used. If Q is less than $Q_{max}$, Q is incremented by 1 (action 266). If Q is equal to $Q_{max}$, Q is reset to the value 1 to begin the refilling of the first output buffer.

In all of the foregoing operations, the following should be understood. Actions requiring notification of other parties (device controllers) are conducted through the channel 10 (FIG. 1). This requires the control unit initiating such action to arbitrate for access to the channel, gain master control of the bus containing the channel, and use the channel to convey the notification information to the other party. The notification information may be formed as directly interpreted signals placed in an addressable register (in the control unit being notified), via the peer communication feature of the channel, or it may be formed as an SCB event control element (recall earlier discussion) which is sent to a pipe feeding another control unit.

The pipe itself can be located in a buffer (separate from the shared data buffers) in system/PSS memory or in a buffer memory integral to the other control unit that it feeds. The router in (or associated with) the control unit initiating the action and determines the physical route for the communication (system memory route or peer communication route to an address in an integral buffer).

An interesting observation or aspect, in regard to what has been described, is that the specific transformation process performed by any device on the data stream has no effect on any other device processing the same stream. All of the actions required to manage the stream flow through the shared buffers, and where necessary to synchronize the processing of input data to external timer events or the handling of another data stream, are controlled by the control units in a manner which is effectively transparent to the devices receiving input data. Thus, such devices can have relatively standard construction and new devices to handle transformation functions that do not exist today can easily be developed without regard to how such functions affect any other aspect of the stream process.

FIG. 20 indicates the logical organization of a control unit (for autonomous stream processing in accordance with this invention) in terms of means provided for accomplishing the functions effectively described in FIGS. 19a–19c.

As indicated at 290, the control unit requires means to receive from PSS the request elements defining the streaming process.

As shown at 291 the control unit requires means responsive to the request elements furnished during setup to prepare the respective unit for the streaming operation (establish register conditions needed for the operation, test availability of paths to specified input and output buffers, etc.).

Means shown at 292 enables the control unit to indicate its readiness or error state to PSS.

Means shown at 293 is conditioned logically by the initiating signal from the host (GO signal or stream control request with immediate resume function), and the conditions established during setup, to start and continue the streaming process in an autonomous manner (i.e. potentially without further input from the host system PSS until all of the data to be processed has been processed). Naturally, this last means includes means for carrying out notification functions specified in Notification type descriptors.

What is claimed is:

1. For a computer system—that contains a processor subsystem, a memory subsystem, peripheral devices, device control units controlling said peripheral devices in response to commands received from said processor subsystem, and a channel linking said device control units to said processor and memory subsystems, said channel having a peer communication feature enabling said control units to communicate directly with each other without intervention of said processor subsystem and without intermediate buffer storage in said memory subsystem of information being communicated between said control units—a mechanism for enabling one of said control units to direct processing of a data stream of arbitrary length, by a device controlled by said one control unit, in cooperation with first and second other said control units respectively controlling first and second other devices, said mechanism comprising:

means in said one control unit for receiving setup command information defining: (1) input and output buffer storage spaces in said memory subsystem that are to be managed by said one control unit in cooperation respectively with said first and second other control units; (2) a notification protocol, defining signals to be directly transferred between said one control unit and said first and second other control units via said peer communication feature of said channel, said signals to be used by said control units for managing use of said input and output buffer storage spaces; and (3) a process to be conducted, on a said data stream of arbitrary length in said input buffer storage space, by said device controlled by said one control unit, said data to be written to said input buffer storage space by said first other device, said process to produce result data to be written to said output buffer storage space for further handling by said second other device, and said process to be conducted to completion without interruption of said processor subsystem; said input and output buffer storage spaces being characterized in that each has insufficient storage capacity to simultaneously store all of the data potentially contained in said data stream;

means in said one control unit responsive to said setup command information for preparing said one control unit and said device controlled by said one control unit to: (1) perform said process defined by said command information on a said data stream to be conveyed through said input buffer storage space; (2) forward data resulting from performance of said process to said second other device via said output buffer storage space; and (3) manage usage of said input and output buffer storage space, in cooperation respectively with said first and second other control units, via said notification protocol and said peer communication feature of said channel; and means in said one control unit, responsive to an initiating signal from said processor subsystem and to conditions established by said preparing means, for directing a streaming operation in which: (1) said process is performed on data of said data stream forwarded through said input buffer storage space; (2) data resulting from performance of said process is forwarded to said second other device via said output buffer storage space; (3) transport of said data stream through said input buffer storage space, and transport of said resulting data through said output buffer storage space, are jointly managed by said one control unit and said first and second other control units using said notification protocol and said peer communication feature of said channel; and (4) all of the foregoing functions are carried out to completion, i.e., until all of the data in the data stream has been processed and forwarded, without interruption of said processor subsystem.

2. The mechanism defined in claim 1 wherein said setup command information received by said one control unit is in the form of a plurality of variously sized requests, each request containing a parameters field including one or more descriptors, each descriptor defining a function essential to said streaming operation.

3. The mechanism in accordance with claim 2 wherein said descriptors include information defining dimensions of said input and output buffer storage spaces in said memory subsystem.

4. The mechanism in accordance with claim 3 wherein said descriptors include information defining an input buffer group constituting said input buffer storage space, said input buffer group containing at least two discretely separate variably sized storage subspaces, information defining dimensions of each of said subspaces, and information allowing for simultaneous access to said subspaces of said input group to enable said first other device to be writing data to one of said subspaces while said device controlled by said one control unit is reading data from another one of said subspaces.

5. The mechanism of claim 4 wherein said descriptors include information defining a communication protocol between said one control unit and said first other control unit, to be conducted via said peer communication feature of said channel; said protocol enabling said one control unit and said first other control unit to control time interleaved access to said subspaces in said input buffer group, by said device controlled by said one and said first other device, in a manner ensuring that data in said data stream is moved efficiently through said input buffer group.

6. The mechanism of claim 3 wherein said descriptors include information defining an output buffer group constituting said output buffer storage space, said output buffer group consisting of at least two discretely separate storage subspaces, information defining dimensions of individual storage subspaces in said output buffer group, and information configuring said one control unit to manage access to said output buffer group in coordination with said second other control unit so as to allow said second other device to read and process data occupying one of said subspaces while data produced by said device controlled by said one control unit is being written to another one of said subspaces.

7. The mechanism of claim 6 wherein said notification protocol is of a form enabling said one control unit and said second other control unit to jointly manage access to said subspaces in said output buffer group, by said device controlled by said one control unit and said device controlled by said second other control unit, in a manner ensuring that said result data is moved efficiently through said output buffer group.

8. A mechanism in accordance with claim 3 wherein:

said input buffer storage space is configured for use as a FIFO (first in first out) buffer device, receiving blocks of data sequentially from said first other device and providing access to said blocks of data to said device controlled by said one control unit in the sequence in which the respective blocks were received.

9. The mechanism in accordance with claim 1 including:

means in said one control unit for providing a signal to said processor subsystem when said means for preparing said one control unit to conduct said streaming operation concludes its actions; said signal to said processor subsystem serving to indicate either that said one control unit is prepared for said streaming operation or that said one control unit can not be prepared for said streaming operation due to error; said signal to said processor subsystem preceding issuance of said initiating signal by said processor subsystem, and being used by said processor subsystem as a condition precedent to issuance of said initiating signal.

10. A mechanism in accordance with claim 1 wherein:

said setup command information includes synchronization information enabling said one control unit to synchronize said streaming operation to another streaming operation occurring external to said one control unit.

11. For use in a computer system, a streaming device adapter controlling a device performing operations requiring processing of arbitrarily long data streams, said adapter comprising:

means enabling said adapter to communicate directly with other device adapters through a channel of said computer system having a peer communication feature permitting such direct communication;

means for receiving setup command information from said computer system defining: (1) an output buffer store having dimensions chosen by said computer system; (2) a source of data to be supplied sequentially to said device controlled by said adapter, said data constituting a data stream of arbitrary length; (3) a process to be conducted by said device controlled by said adapter, on all of the data in said data stream, with data resulting from said process to be written into said output buffer for further process handling by another device controlled by another adapter; and (4) a protocol for communications to be conducted between said adapter and said another adapter, during the performance of said process on said data stream, to coordinate the use of said output buffer by said device and said another device; wherein the length of said data stream exceeds the capacity of said output buffer, requiring repeated use of said output buffer to convey portions of said resulting data to said another device through said output buffer, and wherein said protocol requires use of said direct communication feature of said channel to indicate when data in said output buffer is available for further process handling by said another device; and means responsive to an initiating signal issued by said computer system after said setup command information has been received by said receiving means, and to said setup command information, for directing said device controlled by said adapter to perform said process, and for using said protocol to notify said another adapter when data representing discrete portions of said data stream is available in said output buffer store; said means responsive to an initiating signal causing said process to be performed continuously, until all of the data in said data stream has been processed, without intermediate interruption of or further instructions from said computer system.

12. An adapter according to claim 11 contained in a unit that is separate from said computer system and peripherally attached to said computer system through said channel.

13. A device adapter according to claim 11 implemented in a surrogate unit contained in a program executed by said computer system.

14. An adapter according to claim 11 wherein said output buffer store contains at least two sections, each section capable of storing a data block of predetermined length, and said communication protocol allows for said device controlled by said adapter and said another device to have concurrent access to different said sections; whereby said another device can be processing a block of said resulting data in one of said sections while another block of resulting data is being entered into another one of said sections.

15. An adapter according to claim 11 wherein:

said output buffer store is contained in a memory subsystem of said computer system which is accessible to said device controlled by said adapter through said channel;

said information in said setup commands includes information defining the number of said sections in said output buffer store and dimensions of each section; and said setup command information defining said communications protocol includes information defining events occurring in said sections as conditions precedent to initiating communications from said adapter to said another adapter, and the form of signals to be contained in said communications.

16. An adapter according to claim 11 wherein said computer system is capable of initiating concurrent processing of multiple different data streams, by devices controlled by said adapter and other adapters, and the setup command information furnished to said adapter includes information for synchronizing the processing of one data stream, in said device controlled by said adapter, with the processing of a different data stream in a different device.

17. An adapter according to claim 16 wherein said synchronizing information includes information defining the location of a timing function in the memory of said computer system which provides a time reference to the processing of said different data stream.

18. An adapter according to claim 11 which controls at least one device capable of performing a plurality of different transformational processes on data, and said setup command information includes information defining a selected one of said plurality of transformational processes as said process to be performed on said data stream.

19. A computer system comprising:

a processor subsystem;

a memory subsystem;

a plurality of device adapters;

a plurality of devices each controlled by one of said adapters; and an I/O channel linking said subsystems, said adapters, and said devices; wherein:

said channel includes a peer communication feature enabling said adapters to directly exchange control information without involvement of any of said subsystems;

said processor subsystem includes means for concurrently preparing at least two of said adapters, and respective devices controlled by said at least two adapters, to autonomously process data in a data stream of arbitrary length without interrupting said processor subsystem until all of the data has been processed;

said preparing means includes:

means for furnishing said at least two adapters with information defining: buffer storage spaces in said memory subsystem to be cooperatively managed by said adapters for forwarding the data in said data stream between devices controlled by said at least two adapters; a process to be conducted by devices controlled by said at least two adapters on the data in said data stream; and a communication protocol to be observed by said at least two adapters, via said peer communication feature of said channel, for indicating when said buffer storage spaces contain data that is available to be read and processed by said devices controlled by said at least two adapters; said buffer storage spaces having insufficient storage capacity to simultaneously store all of the data in said data stream;

means for receiving indications from said at least two adapters when said at least two adapters are respectively prepared for controlling processing of data in said data stream; and means for signaling said at least two adapters to begin controlling processing of said data stream;

and said at least two adapters include means responsive to said signal to begin to control respective devices to process data in said data stream; said adapters cooperating via said communication protocol to manage access to said buffer storage spaces and control processing of data in said data stream autonomously, without interrupting said processor subsystem, until all of the data in said data stream has been processed.

20. A computer system containing processor and memory subsystems, a channel linked to said subsystems, said channel having a peer communication feature, and plural device control units and data handling devices linked to said subsystems via said channel, said control units being able to intercommunicate directly with each other via said peer communication feature, wherein said system comprises:

a source of data representing a data stream of arbitrary length to be processed sequentially by a plurality of said devices;

means in said processor subsystem for preparing at least two of said control units to control processing of said data stream by devices respectively controlled by said at least two control units; said preparation including furnishing said control units with information defining variably sized and variably located data buffers in said memory subsystem that are to be shared by pairs of devices controlled by said at least two control units, said buffers being filled with data by one device of each pair and emptied by the other device of the respective pair, said buffers shared by any said pair of devices having insufficient capacity to store the entire data stream at one time; said preparation further including indications by said at least two control units to said processor subsystem when respective control units are prepared to control processing of said data stream by respective devices, and issuance of an initiating signal from said processor subsystem to at least one of said at least two control units when all of said at least two control units have indicated their preparation; and means in said at least two control units, responsive to said initiating signal and information received during said preparation, for controlling respective devices to sequentially process all of the data in said data stream without interruption of said processor subsystem; said at least two control units cooperating in pairs to control forwarding of data between devices controlled by each pair of units; said means responsive to said initiating signal in each said pair of control units using said notification protocol to indicate when a buffer shared by a pair of devices controlled by the respective pair of units, contains data written by one device of the pair that is available for processing by the other device of the same pair.

21. A data handling system comprising:

processor and memory subsystems;

at least two control units;

at least two data handling devices respectively controlled by said at least two control units; and a channel linking said control units and devices to said processor and memory subsystems; said channel having a peer communication feature allowing for said at least two control units to intercommunicate directly with each other without involvement of said processor subsystem; and wherein:

said processor subsystem includes means for setting up and initiating a data streaming operation, to be autonomously controlled by said at least two control units, in which: a data stream of arbitrary length is to be handled in succession by said at least two devices, said data is to be passed to successive ones of said at least two devices through a shared memory buffer allocated by said processor subsystem, and said devices are each to perform a data transformation function selectively specified by said processor subsystem; and each of said at least two control units includes means conditioned by said setting up and initiating means for directing the performance of said data streaming operation by a respective one of said at least two devices in an autonomous manner, requiring no interruption of said processor subsystem prior to completion of the operation, and in a manner which effectively isolates the respective device from conditions and events occurring external to that device; said directing means including means for managing repeated use of said shared memory buffers allocated by said processor subsystem to supply data in said data stream to the respective device and carry transformed data in said data stream away from the respective device; said repeated use being managed in coordination with other said at least two control units, via notification communications conveyed between said control units through said channel, and in a manner which isolates the respective device from buffer reuse events occurring as a result of said notification communications.

* * * * *